United States Patent
Inui et al.

(10) Patent No.: US 12,372,937 B2
(45) Date of Patent: Jul. 29, 2025

(54) CONTROL SYSTEM, INFORMATION PROCESSING APPARATUS, AND INFORMATION PROCESSING PROGRAM

(71) Applicant: OMRON CORPORATION, Kyoto (JP)

(72) Inventors: Tomonari Inui, Kusatsu (JP); Kotaro Okamura, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 118 days.

(21) Appl. No.: 17/837,268

(22) Filed: Jun. 10, 2022

(65) Prior Publication Data

US 2022/0299968 A1    Sep. 22, 2022

Related U.S. Application Data

(63) Continuation of application No. 17/434,836, filed as application No. PCT/JP2020/005789 on Feb. 14, 2020.

(30) Foreign Application Priority Data

Mar. 8, 2019   (JP) ................. 2019-042490

(51) Int. Cl.
 *G05B 19/05*  (2006.01)
 *G06F 16/22*  (2019.01)

(52) U.S. Cl.
 CPC ........... *G05B 19/056* (2013.01); *G06F 16/22* (2019.01)

(58) Field of Classification Search
 CPC ....... G05B 19/056; G05B 19/05; G06F 16/22; G06F 16/2282; G06F 16/21; G06F 16/27; G06F 16/17
 See application file for complete search history.

(56) References Cited

U.S. PATENT DOCUMENTS 6,598,224 B1   7/2003   Maeda et al.
9,727,033 B2   8/2017   Loncar et al.
(Continued)

FOREIGN PATENT DOCUMENTS

CN    104395845 A    3/2015
JP    10-003303 A    1/1998
(Continued)

OTHER PUBLICATIONS

International Search Report for PCT/JP2020/005789 dated Mar. 10, 2020 [PCT/ISA/210].

(Continued)

*Primary Examiner* — Huawen A Peng

(74) *Attorney, Agent, or Firm* — Sughrue Mion, PLLC

(57) ABSTRACT

A control system for controlling a control target includes a database that holds one or more tables, a control apparatus that accesses the database, and an information processing apparatus that supports development of a user program executed in the control apparatus. The information processing apparatus acquires a column name and a data type of each column of a table, the table being selected from among the one or more tables, determines a data type of each member in correspondence with the acquired data type of each column, the data type being available in the user program, and displays a screen including the column name and the data type of each column, and the data type of each member brought into correspondence with the data type of each column.

15 Claims, 20 Drawing Sheets

(56) References Cited

U.S. PATENT DOCUMENTS

| | | | |
|---|---|---|---|
| 11,048,217 B2* | 6/2021 | Schneider | G05B 19/0426 |
| 2002/0133488 A1 | 9/2002 | Bellis et al. | |
| 2004/0015470 A1 | 1/2004 | Smith et al. | |
| 2004/0176864 A1 | 9/2004 | Cocco et al. | |
| 2004/0210631 A1 | 10/2004 | Asher et al. | |
| 2008/0189240 A1 | 8/2008 | Mullins et al. | |
| 2010/0030801 A1 | 2/2010 | Takayama et al. | |
| 2015/0026635 A1 | 1/2015 | Gohr et al. | |
| 2015/0254305 A1 | 9/2015 | Okamura et al. | |
| 2015/0277415 A1 | 10/2015 | Senda et al. | |
| 2016/0291564 A1 | 10/2016 | Okamura | |
| 2017/0003907 A1 | 1/2017 | Kunisada | |
| 2017/0139884 A1* | 5/2017 | Bendig | G06F 40/177 |
| 2018/0341689 A1 | 11/2018 | Zhang et al. | |
| 2019/0018385 A1* | 1/2019 | Soneda | G05B 19/05 |
| 2019/0188289 A1* | 6/2019 | Suzuki | G06F 16/221 |
| 2019/0286550 A1 | 9/2019 | Ohata | |
| 2020/0142379 A1* | 5/2020 | Liu | G05B 19/056 |
| 2020/0183345 A1* | 6/2020 | Wang | G06F 16/285 |

FOREIGN PATENT DOCUMENTS

| | | |
|---|---|---|
| JP | 2000-315167 A | 11/2000 |
| JP | 2006-031214 A | 2/2006 |
| JP | 2016-194808 A | 11/2016 |
| WO | 2013/191275 A1 | 12/2013 |

OTHER PUBLICATIONS

Written Opinion for PCT/JP2020/005789 dated Mar. 10, 2020 [PCT/ISA/237].
Extended European Search Report dated Oct. 7, 2022 in European Application No. 20769408.4.
Office Action dated Mar. 20, 2024 in U.S. Appl. No. 17/434,836.
Office Action dated Feb. 4, 2024 in Chinese Application No. 202080017521.1.
United States Office Action dated Jul. 26, 2024 in U.S. Appl. No. 17/434,836.
"Automatic generation of sqlacchemy table object model by sqlacodegen" http://t.csdnimg.cn/yhzRS, dkjkls, Dec. 17, 2018, pp. 2-3.
Chinese Office Action dated Aug. 2, 2024 in Application No. 202080017521.1.
Chinese Office Action dated Mar. 12, 2025, in Application No. 202080017521.1.
Hong Bo: "Humanities and Social Sciences Forum", Yunnan University Press, Sep. 30, 2012, pp. 395-396.
Notice Of Allowance dated Jan. 15, 2025 in U.S. Appl. No. 17/434,836.

* cited by examiner

FIG.3

DATABASE SELECTION SCREEN

| DATABASE CLASS | SQL Server ⌄ |
| IP ADDRESS/HOST NAME | 192.168.250.92 |
| INSTANCE NAME/PORT No. | 1433 |
| SERVICE NAME/DATABASE NAME | XXX |
| USER NAME | SampleUser |
| PASSWORD | ******** |
| PASSWORD (CONFIRMATION) | ******** |

[RETURN] 542   [NEXT] 540

510
122

CONTROL SYSTEM, INFORMATION PROCESSING APPARATUS, AND INFORMATION PROCESSING PROGRAM

CROSS REFERENCE TO RELATED APPLICATIONS

This application is a Continuation of U.S. application Ser. No. 17/434,836 filed Aug. 30, 2021, which is a National Stage of International Application No. PCT/JP2020/005789 filed Feb. 14, 2020, claiming priority based on Japanese Patent Application No. 2019-042490 filed Mar. 8, 2019, the contents of each of which being herein incorporate by reference in their entireties.

TECHNICAL FIELD

The present disclosure relates to a technique for accessing a table on a database.

BACKGROUND ART

In various production sites, a factory automation (FA) system for production process automation is in widespread use. The FA system is configured with various industrial drive devices. The industrial drive device includes, for example, a moving table for moving a workpiece, a conveyor for conveying the workpiece, and an arm robot for moving the workpiece to a predetermined destination. Such drive devices are controlled by an industrial control apparatus, such as a programmable logic controller (PLC) or a robot controller.

In recent years, a control apparatus and an information processing apparatus that can access a database of an external apparatus have been in widespread use. Japanese Patent Laying-Open No. 2016-194808 (PTL 1) discloses a controller that can "collectively manipulate a plurality of records with a simple structure, in a technology for manipulating a database without having to formulate SQL statements".

CITATION LIST

Patent Literature

PTL 1: Japanese Patent Laying-Open No. 2016-194808

SUMMARY OF INVENTION

Technical Problem

When any of a control apparatus and an information processing apparatus accesses a table of a database for data registered with a structure available in a control program, it is necessary to bring a column in the table and a member in the structure into correspondence with each other. If such correspondence is performed individually by a user using any of the control apparatus and the information processing apparatus, it may take a long time before completion of the correspondence. This leads to the need for a technique of easily bringing a column in a table and a member in a structure into correspondence with each other.

The present disclosure has been made in view of the above circumstances. The present disclosure discloses a technique of easily bringing a column in a table and a member in a structure into correspondence with each other.

Solution to Problem

In an example of the present disclosure, a control system for controlling a control target includes: a database configured to hold one or more tables; a control apparatus configured to execute a control program and access the database; acquisition means configured to acquire a number of columns of a table and a data type of each column, the table being selected from among the one or more tables; setting means configured to define a structure including a number of members corresponding to the acquired number of columns, the structure being available in the control program; and determination means configured to determine a data type of each member of the structure in correspondence with the acquired data type of each column.

According to the present disclosure, the correspondence between the column and member is established in advance, thus allowing the control system to easily perform processing including adding, to the table, a record of a structure with which data is registered.

In an example of the present disclosure, the determination means is configured to determine a data type of each member of the structure from among data types available in the control program.

According to the present disclosure, the control system can easily establish correspondence of the data type of the member in a structure suitable for the data type of the column in the table.

In an example of the present disclosure, the determination means is configured to determine the data type of each member of the structure in accordance with selection by a user from among one or more candidates of a data type.

According to the present disclosure, the control system can provide a user with a data type of a member that can be brought into correspondence with a data type of a column.

In an example of the present disclosure, the determination means is configured to bring a table name of the selected table into correspondence as attribute information of a variable. The variable is used for referring to entirety of the structure.

According to the present disclosure, the control system can provide the user with information indicating with which table the structure in the user program is brought into correspondence.

In an example of the present disclosure, the determination means is configured to bring a member name of each member of the structure into correspondence with a column name of each column.

According to the present disclosure, the control system can provide the user with information by which a member brought into correspondence with a column is identifiable.

In an example of the present disclosure, the control program includes a function block for executing an instruction to control access to the database, and in the function block, each of a table name of the table and a variable for referring to entirety of the structure is set as an argument.

According to the present disclosure, the control system can cause the control apparatus to automatically perform processing including defining a structure and determining a data type of the structure.

In an example of the present disclosure, the control system further includes a generation unit configured to generate a program template for performing processing of adding, to a corresponding table, a record including values set for the respective members.

According to the present disclosure, the control system can easily generate a user program that allows access to a database with the use of the program template.

In an example of the present disclosure, the control system further includes an information processing apparatus configured to support development of the control program executed in the control apparatus, wherein the information processing apparatus includes the acquisition means, the setting means, and the determination means.

According to the present disclosure, the correspondence between a column and a member is established in advance, thus allowing the control system to easily perform processing including adding, to a table, a record of a structure with which data is registered.

In an example of the present disclosure, an information processing apparatus configured to support development of a control program executed in a control apparatus includes: acquisition means configured to acquire a number of columns of a table and a data type of each column, the table being selected from among one or more tables held by a database, the database being accessible to the control apparatus; setting means configured to define a structure including a number of members corresponding to the acquired number of columns, the structure being available in the control program; and determination means configured to determine a data type of each member of the structure in correspondence with the acquired data type of each column.

According to the present disclosure, the correspondence between a column and a member is established in advance, thus allowing the information processing apparatus to easily perform processing including adding, to a table, a record of a structure with which data is registered.

In an example of the present disclosure, an information processing program for an information processing apparatus configured to support development of a control program executed in a control apparatus causes the information processing apparatus to perform the steps of: acquiring a number of columns of a table and a data type of each column, the table being selected from among one or more tables held by a database, the database being accessible to the control apparatus; defining a structure including a number of members corresponding to the acquired number of columns, the structure being available in the control program; and determining a data type of each member of the structure in correspondence with the acquired data type of each column.

According to the present disclosure, the correspondence between a column and a member is established in advance, thus allowing the information processing program to easily perform processing including adding, to a table, a record of a structure with which data is registered.

Advantageous Effects of Invention

According to the present disclosure, correspondence between a column in a table and a member in a structure can be established easily.

BRIEF DESCRIPTION OF DRAWINGS

FIG. 3 shows an example screen for accepting selection of a class of a database.

DESCRIPTION OF EMBODIMENTS

Figure 1:
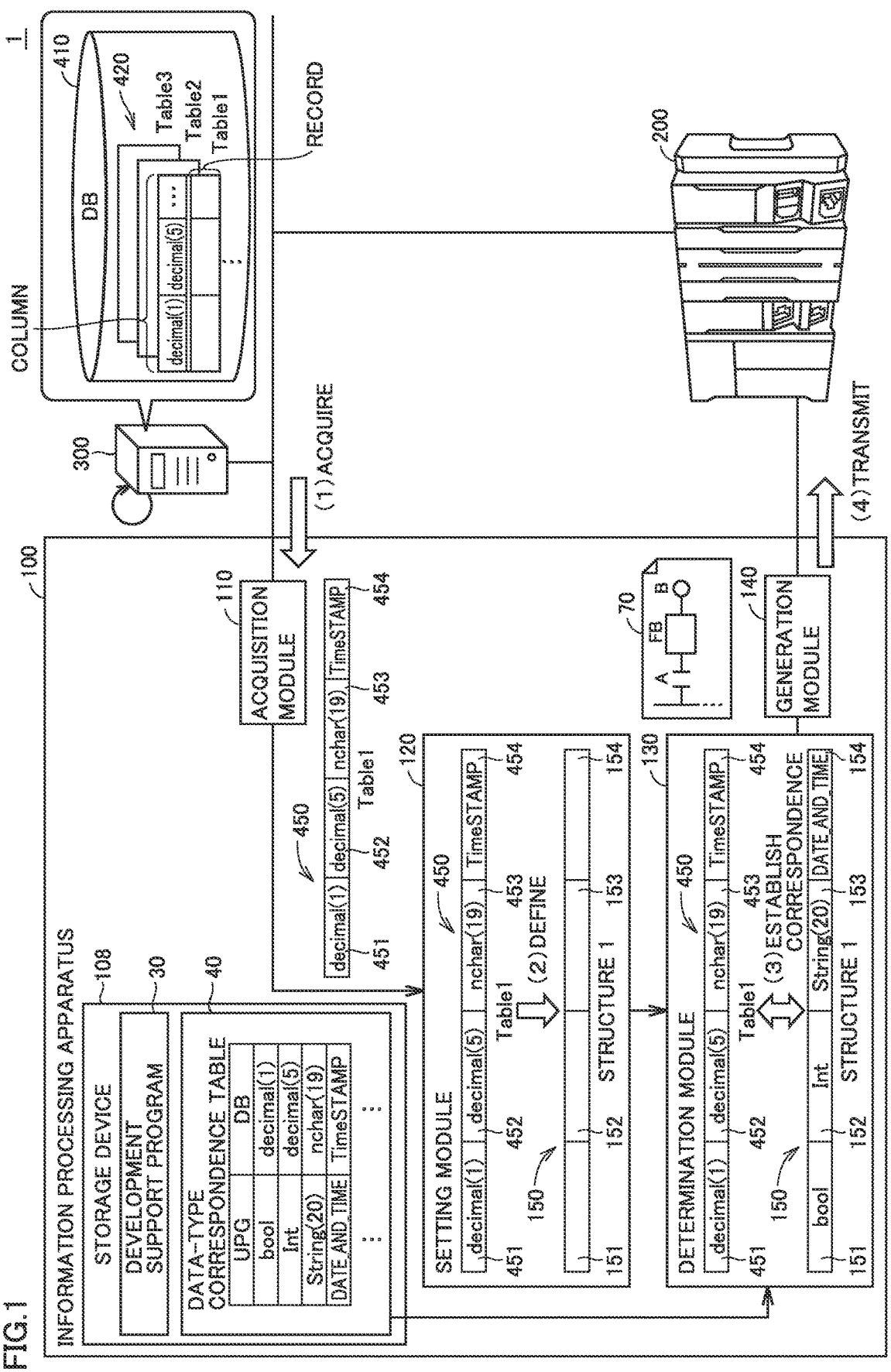
FIG. 1 illustrates an example configuration of a control system.

Embodiments of the present invention will be described in detail with reference to the drawings. The same or corresponding parts in the drawings have the same reference characters allotted, description of which will not be repeated.

A. Application Example

An example application of the present invention will be described with reference to FIG. 1. FIG. 1 illustrates an example configuration of a control system 1. Control system 1 is, for example, an FA system for production process automation. Control system 1 includes an information processing apparatus 100, a control apparatus 200, and an external apparatus 300. Information processing apparatus 100, control apparatus 200, and external apparatus 300 are connected to a first network. The first network is a network suitable for an information network, such as EtherNET (registered trademark).

Control apparatus 200 can access a database 410, which will be described below, in external apparatus 300. The database will also be referred to as DB below. Control apparatus 200 is connected to a drive device (not shown) provided in a field by a second network. Control apparatus 200 performs fixed-cycle communications with the drive device. The second network is, for example, EtherCAT (registered trademark), EtherNet/IP (registered trademark), or CompoNet (registered trademark).

External apparatus 300 is a database management system (DBMS) having a database function. External apparatus 300 is, for example, a notebook personal computer (PC) or a server. More specifically, external apparatus 300 has database 410. Database 410 holds one or more tables 420. Table 420 includes one or more columns indicating vertical field(s), and one or more records indicating horizontal field(s). In each column, a data type corresponding to the type of data stored is set.

Information processing apparatus 100 is, for example, a notebook or desktop PC, a tablet, a smartphone, or a device capable of developing a control program for control apparatus 200. The control program can be installed in control apparatus 200 as a user program (e.g., a user program 70, which will be described below). The control program will also be referred to as a user program (UPG) below. Information processing apparatus 100 can access database 410 in external apparatus 300. Information processing apparatus 100 includes a storage device 108, an acquisition module 110, a setting module 120, a determination module 130, and a generation module 140. Storage device 108 includes a development support program 30 and a data-type correspondence table 40.

Development support program 30 is a program for supporting the development of a control program for control apparatus 200. When development support program 30 stored in storage device 108 is read and executed, information processing apparatus 100 can execute the functions of acquisition module 110, setting module 120, determination module 130, and generation module 140.

Data-type correspondence table 40 is a list showing a correspondence between a data type of a column in table 420 of database 410 and a data type of a member in a structure in user program 70. The structure stores the collection of data in a certain form. Thus, the structure can also be referred to as a data group that can be handled as a unit. The structure may include members associated with each other in an identifiable manner.

Acquisition module 110 acquires the information of table 420 selected through a user operation accepted by information processing apparatus 100 among one or more tables 420 held in database 410. The information of table 420 includes the number of columns of table 420 and the data type of each column. Acquisition module 110 acquires, for example, "4" as the number of columns of a first table. The number "4" of columns is a sum of a first column 451, a second column 452, a third column 453, and a fourth column 454 in the first table. One or more columns will also be collectively referred to as column(s) 450 below.

Acquisition module 110 acquires data types of columns 450 (e.g., first column 451 to fourth column 454). More specifically, acquisition module 110 acquires "decimal (1)" set as the data type of first column 451. Acquisition module 110 acquires "decimal (5)" set as the data type of second column 452. Acquisition module 110 acquires "nchar (19)" set as the data type of third column 453. Acquisition module 110 acquires "TimeSTAMP" set as the data type of fourth column 454. Herein, "decimal" is a data type that handles a fixed-point number, "nchar" is a data type of a fixed-length character string, and "TimeSTAMP" is a data type of a time stamp with six attributes including year, month, day, hour, minute, and second.

Setting module 120 defines a structure corresponding to the number of columns 450 acquired by acquisition module 110. The structure is available in user program 70 and includes the number of members corresponding to the number of columns.

More specifically, setting module 120 defines a structure including the number "4" of members corresponding to the number "4" of columns. Setting module 120 defines, for example, a first structure including a first member 151, a second member 152, a third member 153, and a fourth member 154. One or more members will also be collectively referred to as member(s) 150 below.

Determination module 130 determines the data type of each member 150 of the structure in correspondence with the data type of each column 450 acquired by acquisition module 110. More specifically, determination module 130 determines a data type of each member 150 in correspondence with the data type of each column 450 based on data-type correspondence table 40. Determination module 130 determines "bool" as the data type of first member 151 corresponding to "decimal (1)" of the data type of first column 451. Determination module 130 determines "Int" as the data type of second member 152 corresponding to "decimal (5)" of the data type of second column 452. Determination module 130 determines "String (20)" as the data type of third member 153 corresponding to "nchar (19)" of the data type of third column 453. Determination module 130 determines "DATE_AND_TIME" as the data type of fourth member 154 corresponding to "TimeSTAMP" of the data type of fourth column 454. Thus, control system 1 can easily bring column 450 in table 420 and member 150 in the structure into correspondence with each other.

Generation module 140 generates user program 70 and transmits the generated user program 70 to control apparatus 200. Control apparatus 200 registers data with each member 150 of the structure. User program 70 is a program for performing processing of adding, to table 420 of database 410, a record of the structure with which the data is registered, by way of example. Control system 1 can easily perform the processing including adding, to table 420, a record of a structure with which data is registered because the correspondence between column 450 and member 150 is established in advance.

Embodiment 1

Embodiments of the present invention will now be described with reference to the drawings. In the following description, the same parts or components have the same reference characters allotted. Their names and functions are also the same, description of which will not be repeated.

A. Hardware Configuration of Information Processing Apparatus 100

Figure 2:
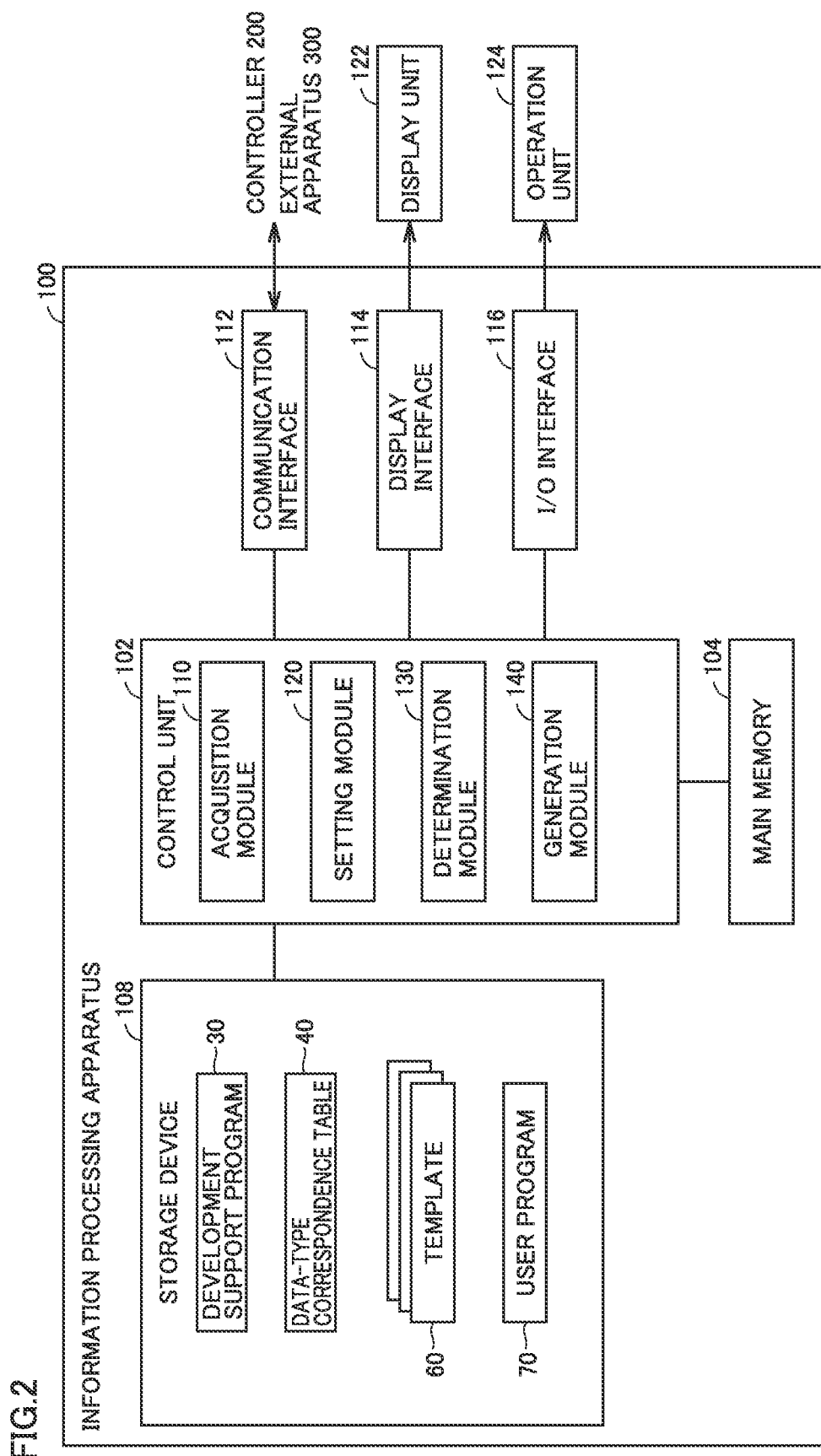
FIG. 2 shows a hardware configuration of an information processing apparatus.

FIG. 2 shows a hardware configuration of information processing apparatus 100. Referring to FIG. 2, information processing apparatus 100 includes a control unit 102, a main memory 104, storage device 108, a communication interface 112, a display interface 114, and an I/O interface 116.

Control unit 102 reads development support program 30 stored in storage device 108 and develops development support program 30 to main memory 104. Control unit 102 functions as acquisition module 110, setting module 120, determination module 130, and generation module 140. The following will describe an example configuration in which necessary processing is implemented by control unit 102 executing development support program 30, but a part or all of the processing provided may be implemented using a dedicated hardware circuit (e.g., ASIC or FPGA).

Storage device 108 includes development support program 30, data-type correspondence table 40, a template 60, and user program 70. Template 60 is used as a model when generation module 140 generates user program 70. A specific example in which generation module 140 generates a user program using template 60 will be described below.

Communication interface 112 exchanges data with another communication apparatus through, for example, the first network. Examples of the other communication apparatus include control apparatus 200, external apparatus 300 and the like. Information processing apparatus 100 may be configured to download various programs such as development support program 30 from the other communication apparatus via communication interface 112.

Display interface 114 is electrically connected with display unit 122 and sends an image signal for displaying an image to display unit 122 in accordance with a command from control unit 102 or the like. Display unit 122 includes a liquid crystal display (LCD), an organic electro luminescence (EL) display or the like, and presents various types of information to the user. In display unit 122, various screens (e.g., a database selection screen 510 (see FIG. 3), which will be described below) provided by information processing apparatus 100 may be displayed. The example of FIG. 2 shows information processing apparatus 100 and display unit 122 as separate units, but information processing apparatus 100 and display unit 122 may be configured integrally.

I/O interface 116 is electrically connected with operation unit 124 and captures a signal indicating a user operation from operation unit 124. Operation unit 124 typically includes a keyboard, a mouse, a touch panel, a touch pad or the like, and accepts an operation from a user.

B. Example Screen of Setting for Bringing Column 450 and Member 150 into Correspondence with Each Other Description will now be given of an example screen of a setting for bringing column 450 in database 410 and member 150 in user program 70 into correspondence with each other, with reference to FIGS. 3 to 8. This setting is performed by information processing apparatus 100 accepting a user operation using operation unit 124.

b1. Database Selection Screen 510

FIG. 3 shows an example screen for accepting selection of a class of database 410. Referring to FIG. 3, display unit 122 displays database selection screen 510 including particulars such as a database class, an IP address, an instance name, a service name, a user name, and a password, a next screen button 540, and a previous screen button 542.

Information processing apparatus 100 accepts, for example, selection of database 410 by the user using operation unit 124. The class of database 410 is, for example, "Oracle Database", "MySQL", "SQLite" or the like. The class of the database is not limited thereto and may be any other type of database.

Information processing apparatus 100 accepts an input of any other piece of information including a database class. As next screen button 540 is selected through a user operation using operation unit 124, information processing apparatus 100 then displays table selection screen 511, shown in FIG. 4, in display unit 122. When previous screen button 542 is selected through the user operation using operation unit 124, information processing apparatus 100 displays a screen displayed in display unit 122 immediately before the display of database selection screen 510.

b2. Table Selection Screen 511

Figure 4:
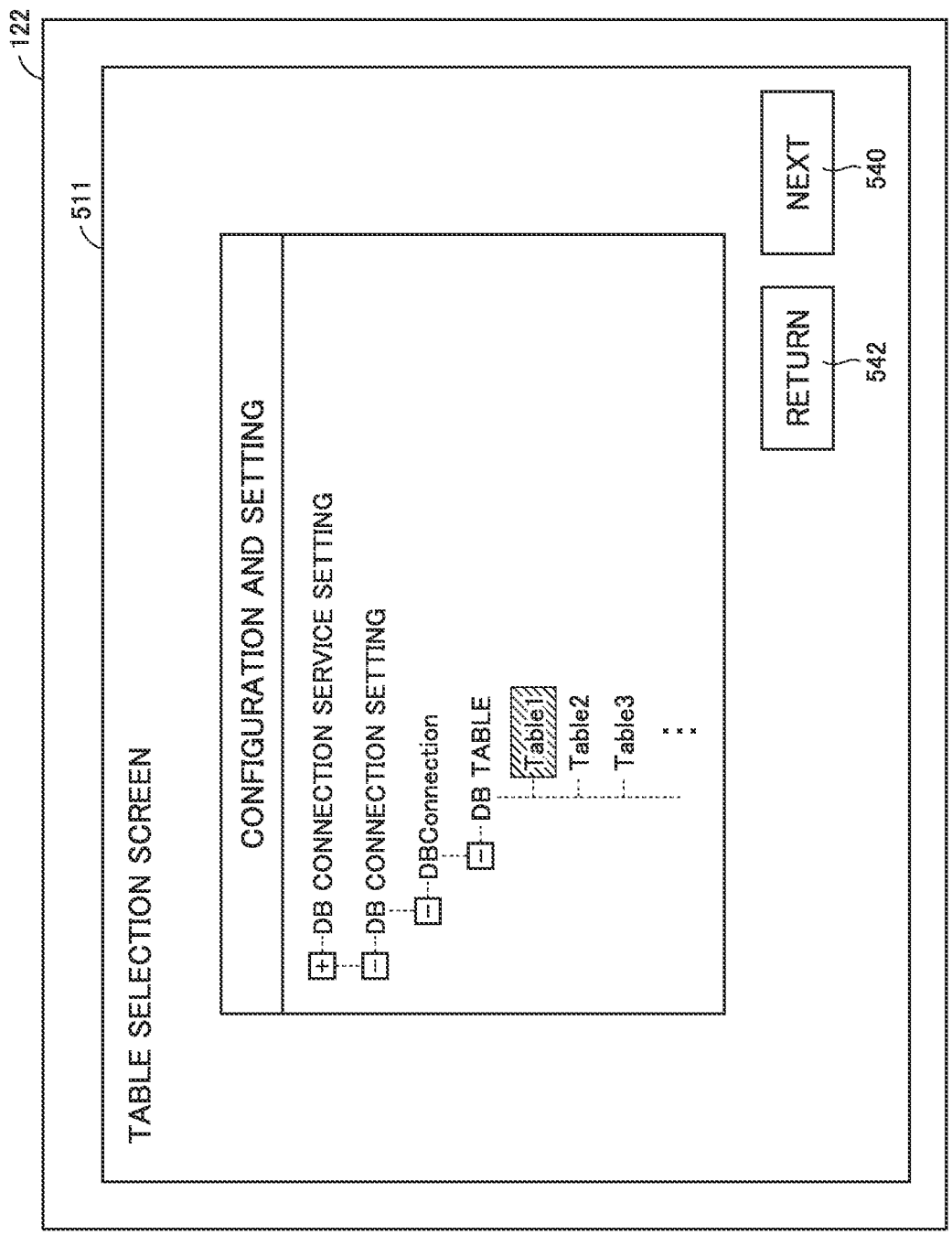
FIG. 4 shows an example screen for accepting selection of a table of a database.

FIG. 4 shows an example screen for accepting selection of table 420 of database 410. Referring to FIG. 4, display unit 122 displays table selection screen 511 including particulars such as a DB connection service setting, a DB connection setting, and a DB table, next screen button 540, and previous screen button 542. Information processing apparatus 100 accepts, for example, selection of table 420 by the user using operation unit 124. When next screen button 540 is selected through a user operation using operation unit 124, information processing apparatus 100 then displays a data type selection screen 512 shown in FIG. 5 in display unit 122. When previous screen button 542 is selected through the user operation using operation unit 124, information processing apparatus 100 displays a screen displayed in display unit 122 immediately before the display of table selection screen 511.

b3. Data Type Selection Screen 512

Figure 5:
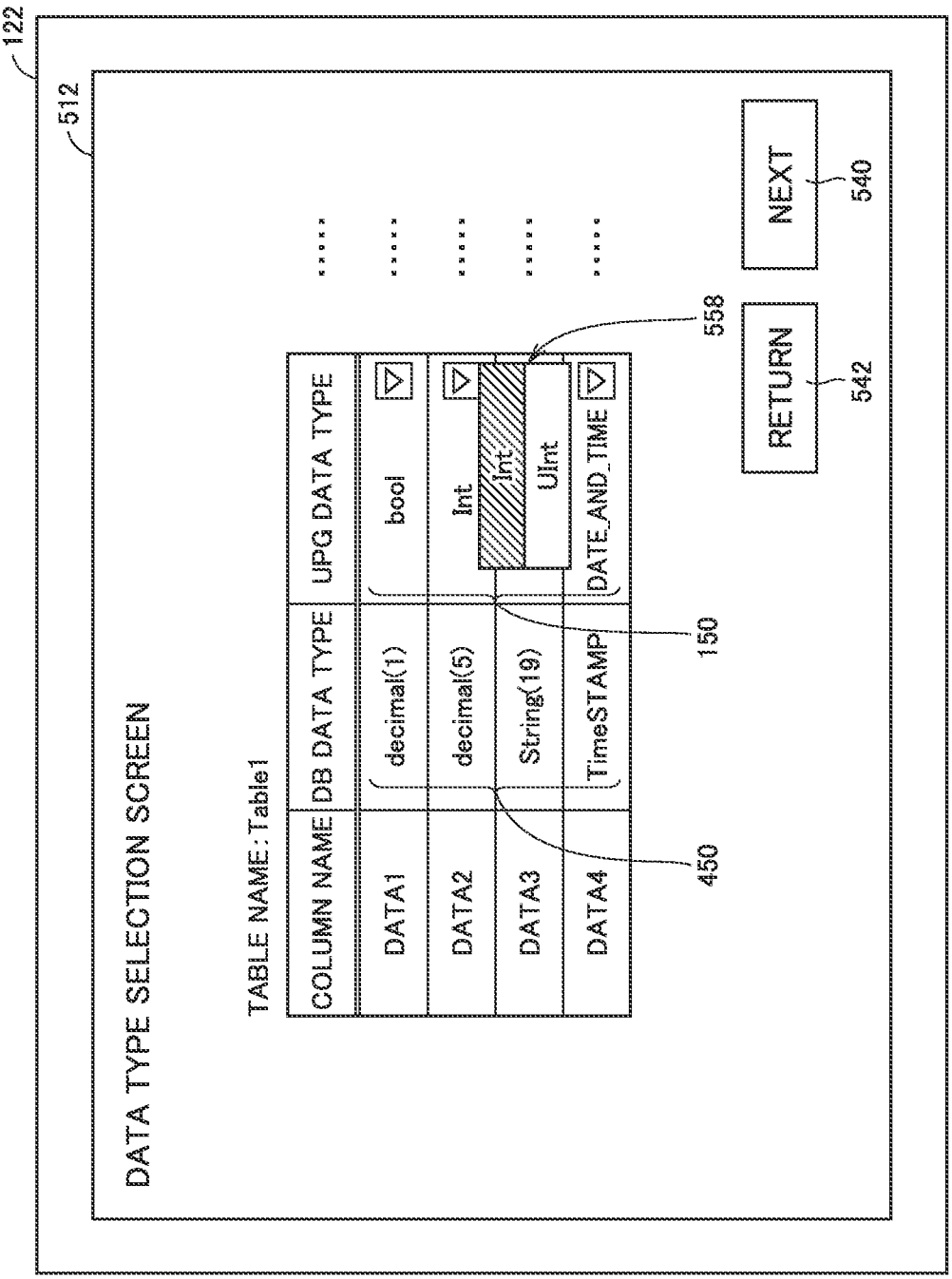
FIG. 5 shows an example screen for accepting selection of a data type of a structure.

FIG. 5 shows an example screen for accepting selection of a data type of a structure. Referring to FIG. 5, display unit 122 displays data type selection screen 512 including particulars including a column name, a DB data type, and a UPG data type of the first table, next screen button 540, and previous screen button 542. The first table is a table selected on table selection screen 511 described above in display unit 122. The column name is attribute information of each column 450 and is information included in table 420. The column name is information, for example, "DATA1" to "DATA4", by which each column 450 is identifiable. The DB type is a data type set for each column 450. The UPG data type is a data type of each member 150 which is brought into correspondence with the data type of each column 450. This correspondence is established based on data-type correspondence table 40.

Information processing apparatus 100 accepts, for example, selection of the UPG data type by the user using operation unit 124. More specifically, determination module 130 of information processing apparatus 100 determines the data type of each member 150 of the structure in accordance with the selection by the user using operation unit 124 from among one or more candidates of the data type displayed in selection field 558. This allows control system 1 to provide the user with the data type of member 150 that can be brought into correspondence with the data type of column 450.

The information on the DB data included in data type selection screen 512 is based on the number of columns 450 acquired by acquisition module 110 from table 420 of database 410 and the data type of each column 450. The information on the column name included in data type selection screen 512 is attribute information acquired by acquisition module 110 from table 420 of database 410. Further, the information on the UPG data type included in data type selection screen 512 is determined by setting module 120 and determination module 130. Setting module 120 defines the structure including the number of members 150 corresponding to the number of columns 450 acquired by acquisition module 110. Determination module 130 determines the data type of each member 150 of the structure in correspondence with the data type of each column 450 acquired by acquisition module 110. The correspondence is established based on data-type correspondence table 40. In this manner, determination module 130 determines the data type of each member 150 of the structure from among the data types available in user program 70. This allows control system 1 to easily establish correspondence of the data type of member 150 in a structure suitable for the data type of column 450 in table 420.

Figure 6:
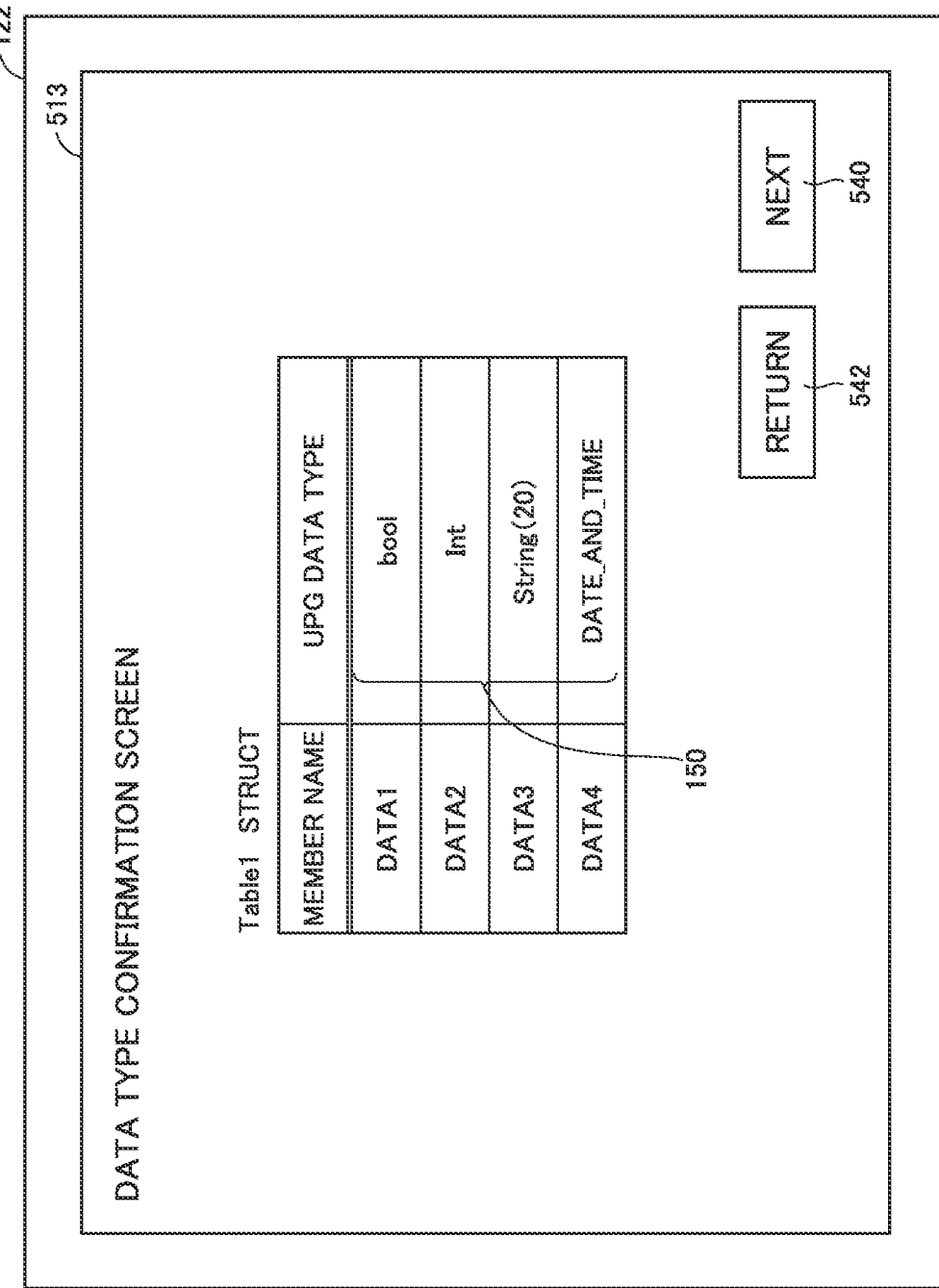
FIG. 6 shows an example screen on which a data type of a structure is displayed for confirmation by a user.

When next screen button 540 is selected through a user operation using operation unit 124, information processing apparatus 100 displays a data type confirmation screen 513 shown in FIG. 6 in display unit 122. When previous screen button 542 is selected through the user operation using operation unit 124, information processing apparatus 100 displays a screen displayed on display unit 122 immediately before the display of data type selection screen 512.

b4. Data Type Confirmation Screen 513

FIG. 6 shows an example screen on which a data type of a structure is displayed for confirmation by the user. Referring to FIG. 6, display unit 122 displays data type confirmation screen 513 including particulars including the member name and the UPG data type of the first table, next screen button 540, and previous screen button 542. Display unit 122 displays the UPG data type of each member 150 selected by the user using operation unit 124 on data type selection screen 512. Display unit 122 also displays the same information (e.g., "DATA1" to "DATA4") as the column name displayed on data type selection screen 512 as the member name of each member 150. More specifically, determination module 130 registers the column name, which is the attribute information of each column 450, as the member name, which is the attribute information of member 150. In this manner, determination module 130 brings the member name of each member 150 of the structure into correspondence with the column name of each column 450. This allows control system 1 to provide the user with the information by which member 150 brought into correspondence with column 450 is identifiable.

Figure 7:
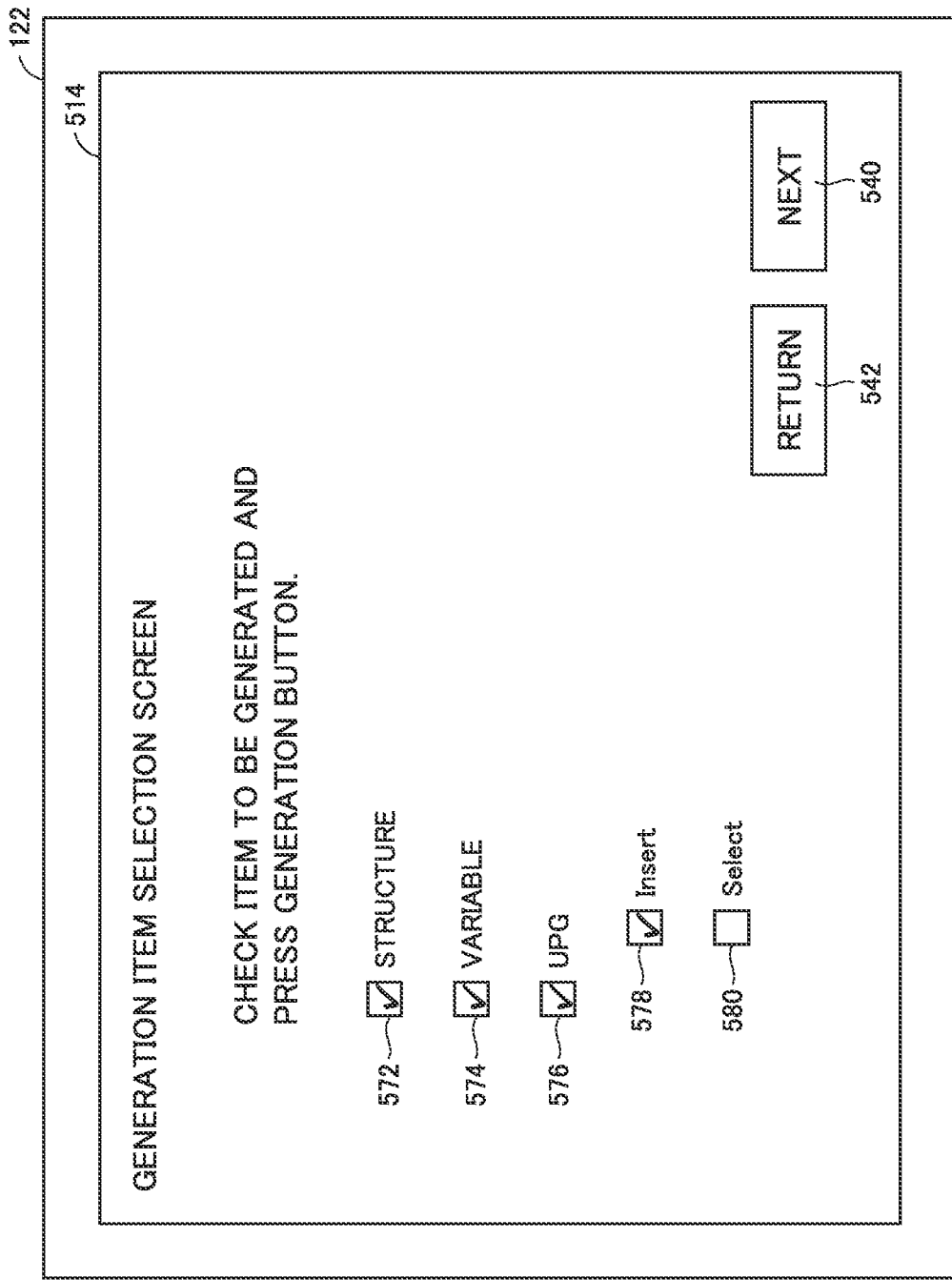
FIG. 7 shows an example screen for selecting generation items including a structure.

When next screen button 540 is selected through the user operation using operation unit 124, information processing apparatus 100 displays a generation item selection screen 514 shown in FIG. 7 in display unit 122. When previous screen button 542 is selected through the user operation using operation unit 124, information processing apparatus 100 displays a screen displayed in display unit 122 immediately before the display of data type confirmation screen 513.

b5. Generation Item Selection Screen 514

FIG. 7 shows an example screen for selecting generation items including a structure. Referring to FIG. 7, display unit 122 displays generation item selection screen 514 including particulars including structure 572, variable 574, UPG 576, Insert 578, and Select 580, next screen button 540, and previous screen button 542. Generation module 140 of information processing apparatus 100 generates data corresponding to the particulars selected through the user operation using operation unit 124. Description will be given assuming that the particulars including structure 572, variable 574, UPG 576, and Insert 578 are selected as shown in FIG. 7. Although description will be given below assuming that the particular, Insert 578, is selected, when the particular, Select 580, is selected, data corresponding to the selected particular is generated. When particulars including both of Insert 578 and Select 580 are selected, data corresponding to these particulars is generated.

Figure 8:
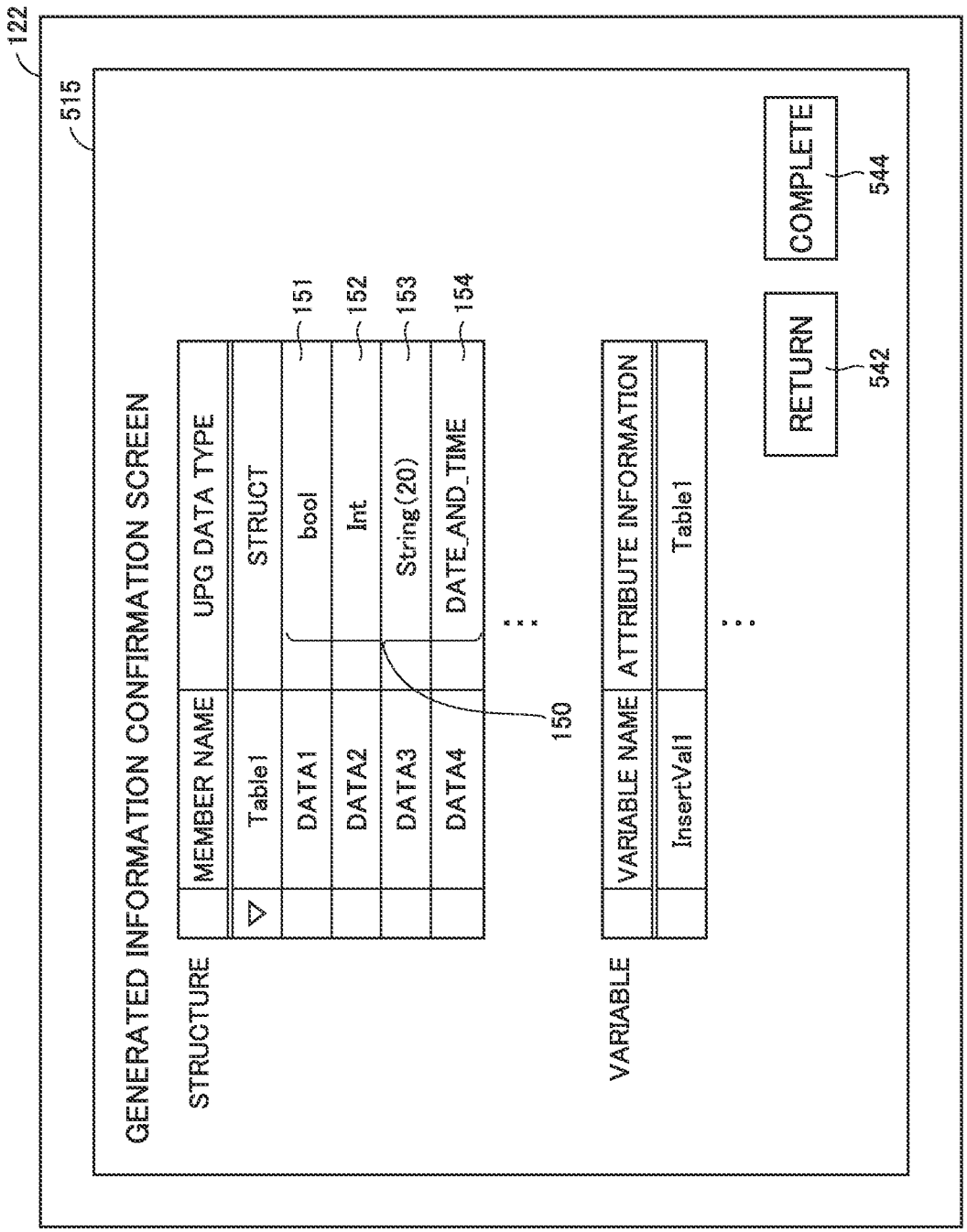
FIG. 8 shows an example screen on which a structure and a variable for confirmation by a user are displayed.

When next screen button 540 is selected through the user operation using operation unit 124, information processing apparatus 100 displays a generated information confirmation screen 515 shown in FIG. 8 in display unit 122. When previous screen button 542 is selected through the user operation using operation unit 124, information processing apparatus 100 displays a screen displayed in display unit 122 immediately before the display of generation item selection screen 514.

b6. Generated Information Confirmation Screen 515

FIG. 8 shows an example screen on which a structure and a variable generated for confirmation by a user are displayed. Display unit 122 displays, for example, member names and UPG data types of the structure in the first table, and a variable name and attribute information of the variable. More specifically, display unit 122 displays, as member names of the structure, member names ("DATA1" to "DATA4") brought into correspondence with the column names described with reference to FIG. 6. Display unit 122 also displays data types of the respective members 150 as the UPG data types brought into correspondence with the DB data types described with reference to FIG. 5. Display unit 122 displays, as the data types of the respective members 150, for example, "bool" for first member 151, "Int" for second member 152, "String (20)" for third member 153, and "DATE_AND_TIME" for fourth member 154.

Display unit 122 further displays variable name "InsertVal1" and attribute information "Table1" as variables. The variable name indicates the entire structure.

Any appropriate value is set for this variable name. The attribute information indicates table 420 corresponding to the entire structure. The structure including members 150 shown in FIG. 8 corresponds to each column 450 of the first table. Thus, the information of "Table1" is registered for the attribute information. The attribute information is determined by determination module 130 of information processing apparatus 100. More specifically, determination module 130 establishes the correspondence of the table name of table 420 selected through the user operation using operation unit 124, described with reference to FIG. 4, as the attribute information of a variable for referring to the entire structure. This allows control system 1 to provide the user with the information indicating with which table 420 the structure in user program 70 is brought into correspondence. Generation module 140 then generates data including the variable name and the attribute information.

When complete button 544 is selected through the user operation using operation unit 124, information processing apparatus 100 ends the display of generated information confirmation screen 515 shown in FIG. 8. When previous screen button 542 is selected through the user operation using operation unit 124, information processing apparatus 100 displays a screen displayed in display unit 122 immediately before the display of generated information confirmation screen 515.

C. Configuration and Contents of Processing of User Program 70

The configuration and the contents of processing of user program 70 will now be described with reference to FIGS. 9 to 11. User program 70 is based on the setting of member 150 in the structure corresponding to the number of columns 450 and the data types in the first table shown in FIGS. 3 to 6 described above. As UPG 576 and Insert 578 in FIG. 7 are selected, generation module 140 generates user program 70.

Figure 9:
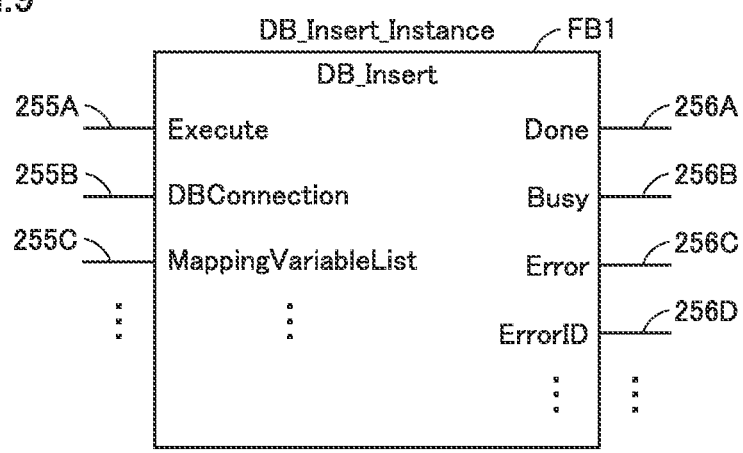
FIG. 9 shows an example function block included in a user program.

FIG. 9 shows an example of a function block FB1 included in user program 70. Function block FB1 will also be referred to as block FB1 below.

A program having the function of block FB1 may be defined by a block other than a function block. For example, block FB1 may also include a block defined by a ladder diagram, a block defined by any of an instruction list, a structured text, and a sequential function chart, or a combination thereof Block FB1 may also include a block defined in a general programming language such as JavaScript (registered trademark) or C language.

Block FB1 is a program for executing an instruction to control access to database 410. More specifically, block FB1 is a program of a defined data type and has a function of adding, to table 420 of database 410, a record of a structure in which data satisfying the condition for the data type is set.

Block FB1 includes an input unit 255A to an input unit 255C for accepting a setting for the addition of a record and an output unit 256A to an output unit 256D for outputting the information about the addition of a record.

Input unit 255A indicated as "Execute" accepts a setting for designating whether or not to perform processing of adding a record. As an example, input unit 255A is defined to accept an input of "BOOL" type. Processing of adding a record is not performed as long as "FALSE" is input to input unit 255A. Contrastingly, when "TRUE" is input to input unit 255A, processing of adding a record is performed.

Input unit 255B indicated as "DBConnection" accepts a connection result obtained by executing a function block for connection to database 410. The connection result includes information (e.g., database name) for accessing database 410.

Input unit 255C indicated as "MappingVariableList" accepts an input of a variable of a structure. Input unit 255C is defined to accept a predefined structure.

When the processing of adding a record completes normally, a signal indicating a normal end is output from output unit 256A indicated as "Done". During the processing of adding a record, a signal indicating generation processing being performed is output from output unit 256B indicated as "Busy". When the processing of adding a record is not generated normally, a signal indicating an abnormal end is output from output unit 256C indicated as "Error". In this case, an error ID for identifying the nature of an error is further output from output unit 256D indicated as "ErrorID".

Figure 10:
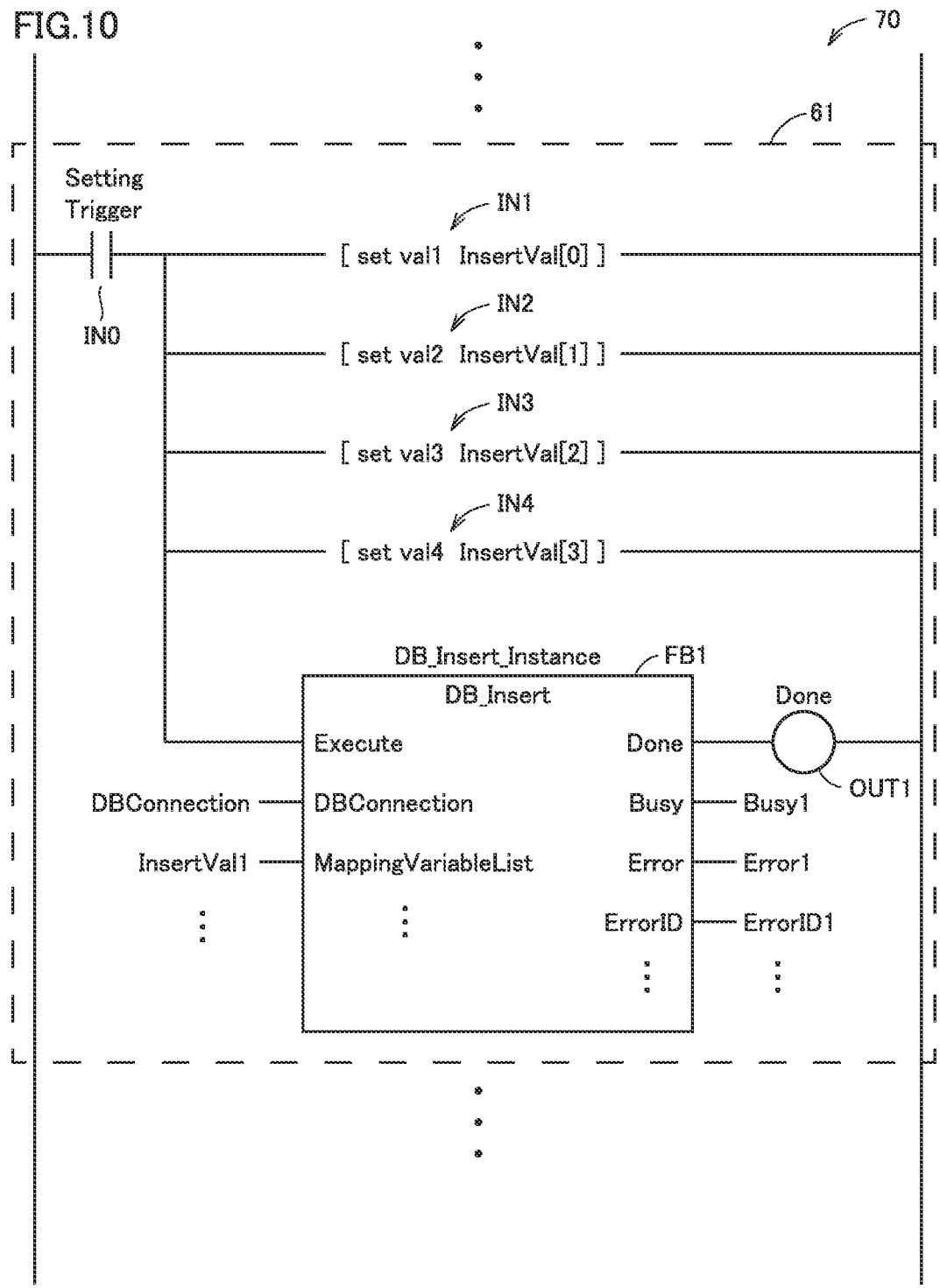
FIG. 10 illustrates an example user program including a function block.

FIG. 10 illustrates an example of user program 70 including function block FB1. Information processing apparatus 100 generates a part of user program 70 shown in FIG. 10 using template 60 stored in storage device 108. Template 60 includes, for example, input elements IN0 to IN4, block FB1, and an output element OUT1. For example, variables of input elements IN0 to IN4 and a variable of output element OUT1 which are included in template 60 are blank, and the variables are allocated after the selection of template 60. Template 60 with allocated variables will be referred to as a program template below. The program template includes a first program template 61 and a second program template 62, which will be described below. Block FB1 corresponds to the function block described with reference to FIG. 9.

First program template 61 includes input elements IN0 to IN4. Variables are allocated to input elements IN0 to IN4, and values of these variables change in accordance with the allocated variables. More specifically, variable "SettingTrigger" is allocated to input element IN0. Variable "SettingTrigger" is of BOOL type, and an initial value thereof is "False" (=OFF). The value of variable "SettingTrigger" changes to "True" (ON) based on, for example, activation of control apparatus 200. In any other case, the value of variable "SettingTrigger" is "False" (OFF).

Variable "val1" to variable "val4" are allocated to input elements IN1 to IN4. These variables include, for example, a process value obtained by control apparatus 200 executing an operation based on a field value. The field value is a value acquired by control apparatus 200 from the drive device provided in the field via the second network. Input elements IN1 to IN4 set the respective values of the variables of variable "val1" to variable "val4" at "InsertVal[0]" to "InsertVal[3]". "InsertVal[0]" to "InsertVal[3]" are values based on variable "InsertVal" indicating the entire structure and also are values set to first member 151 to fourth member 154.

When input elements IN1 to IN4 set the process values of the respective members 150 of the structure, block FB1 adds a record configured by each member 150 of the structure to table 420.

Variable "Done" is allocated to output element OUT1. Output element OUT1 is also associated with output "Done" of block FB1. Consequently, the value of output element OUT1 changes in accordance with the value of output "Done" of block FB1.

Figure 11:
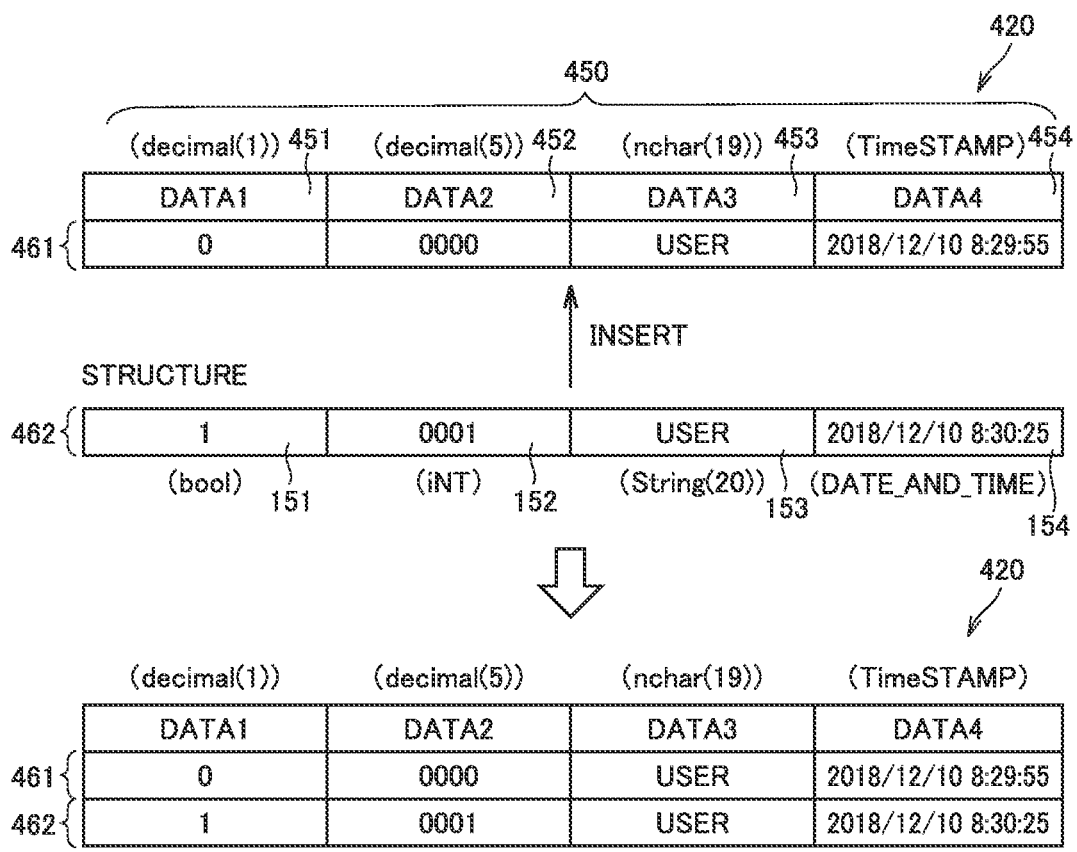
FIG. 11 shows an example of addition of a record to a table.

FIG. 11 shows an example of the addition of a record to table 420. The respective columns 450 (first column 451 to fourth column 454) in table 420 have "DATA1" to "DATA4", each of which is attribute information. In record 461, process values corresponding to the data types of the respective columns 450 are set. With first program template 61 generated by generation module 140, record 462 in the structure is added to table 420. In record 462 of the structure, the data types brought into correspondence with the data types of the respective columns of table 420 are set for the respective members 150 (first member 151 to fourth member 154). In record 462, process values corresponding to the data types of the respective members 150 are set. Record 462 is added to table 420 as first program template 61 obtained by allocating variables to template 60 is executed.

As described above, generation module 140 generates, based on template 60, first program template 61 for performing processing of adding a record including a value (process value) set for each member 150 in the structure to its corresponding table 420. First program template 61 is a program generated based on template 60 and has an allocated variable which is blank in template 60. Control system 1 can easily generate user program 70 that allows access to database 410 with the use of the program template.

D. Hardware Configuration d1. Hardware Configuration of Control Apparatus 200

Figure 12:
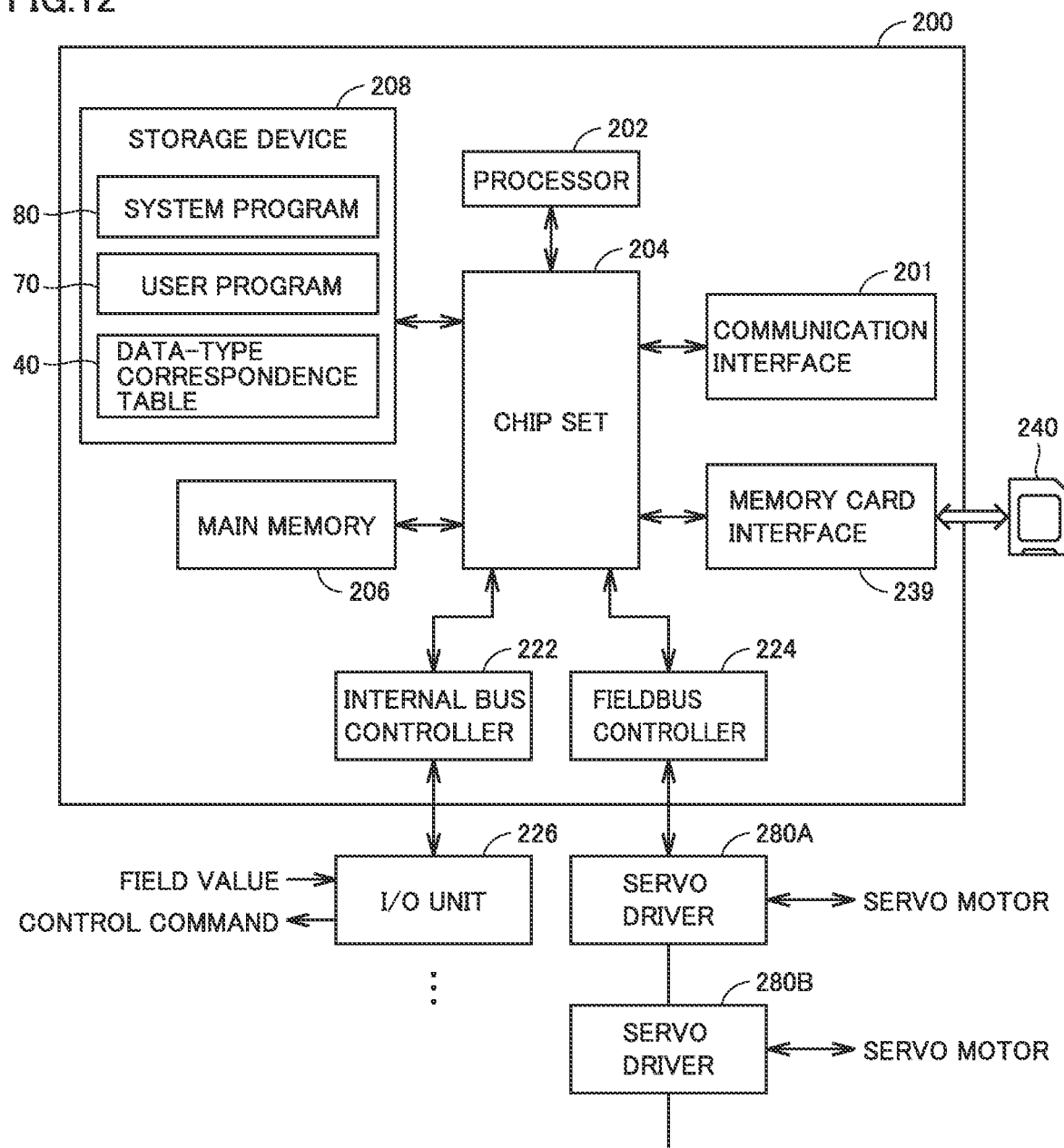
FIG. 12 schematically shows an example hardware configuration of a control apparatus.

A hardware configuration of control apparatus 200 will now be described with reference to FIG. 12. FIG. 12 is a schematic diagram showing an example hardware configuration of control apparatus 200.

Control apparatus 200 includes a communication interface 201, a processor 202, such as CPU or MPU, a chip set 204, a main memory 206, a non-volatile storage device 208, an internal bus controller 222, a fieldbus controller 224, and a memory card interface 239.

Processor 202 reads a control program including user program 70 and system program 80 stored in storage device 208, deploys the control program to main memory 206, and executes the control program. Processor 202 implements any control on servo drivers 280A, 280B and the like by executing the control program. The control program includes various programs for controlling control apparatus 200. System program 80 included in the control program includes operation codes for providing basic functions of control apparatus 200, such as data input/output processing and execution timing control. User program 70 is downloaded from information processing apparatus 100 described above. User program 70 is appropriately designed in accordance with a control target and executes sequence control.

Chip set 204 controls each component, thereby implementing processing as the entire control apparatus 200.

Storage device 208 stores various pieces of data in addition to the control program. As an example, storage device 208 stores data-type correspondence table 40 and the like described above.

Internal bus controller 222 is an interface that exchanges data with various devices coupled to control apparatus 200 via an internal bus. As an example of such a device, I/O unit 226 is connected. Fieldbus controller 224 is an interface that exchanges data with various drive devices coupled to control apparatus 200 via the field bus. As examples of such devices, servo driver 280A and 280B described above are connected. Additionally, a drive device such as a visual sensor (not shown) may be connected.

Internal bus controller 222 and fieldbus controller 224 can issue any appropriate command to a device connected thereto and can also acquire any appropriate data managed by the device. Internal bus controller 222 and/or fieldbus controller 224 also function(s) as an interface for data exchange between servo drivers 280A and 280B.

Communication interface 201 controls data exchange through various wired/wireless networks. Control apparatus 200 communicates with information processing apparatus 100 or external apparatus 300 via communication interface 201. Control apparatus 200 can also access database 410 on external apparatus 300 via communication interface 201.

Memory card interface 239 is configured to allow memory card 240 (e.g., SD card), which is an example external storage medium, to be detached therefrom, and allows writing and reading of data into and from memory card 240.

d2. Hardware Configuration of External Apparatus 300

Figure 13:
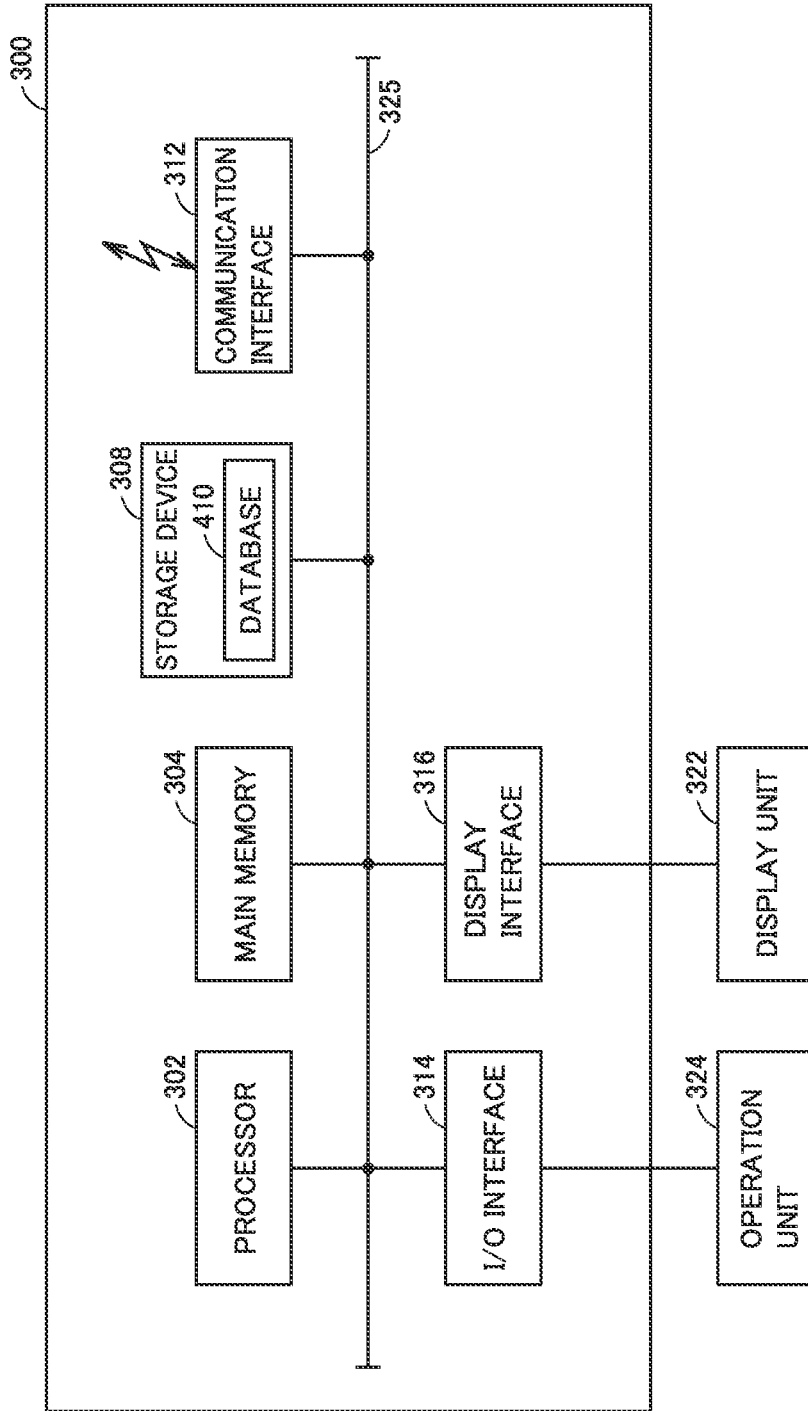
FIG. 13 is a block diagram showing a hardware configuration of an external apparatus.

A hardware configuration of external apparatus 300 will now be described with reference to FIG. 13. FIG. 13 is a block diagram showing the hardware configuration of external apparatus 300.

External apparatus 300 has a hardware configuration with a general architecture. In other words, external apparatus 300 is implemented as one type of personal computer. However, external apparatus 300 may be implemented using dedicated hardware, not general-purpose hardware.

More specifically, external apparatus 300 includes a processor 302, such as CPU or MPU, a main memory 304, a non-volatile storage device 308, a communication interface 312, an I/O interface 314, and a display interface 316. These components are connected to each other via internal bus 325 so as to communicate data.

Processor 302 controls external apparatus 300 by reading a control program (not shown) stored in storage device 308, deploying the control program to main memory 304, and executing the control program. In other words, processor 302 implements a control unit that performs a control operation, in cooperation with main memory 304 and storage device 308.

Communication interface 312, I/O interface 314, and display interface 316 intermediate data exchange between external apparatus 300 and any other communication device.

More specifically, communication interface 312 intermediates communications with control apparatus 200 via, for example, the first network in FIG. 1. Communication interface 312 may be, for example, a component capable of communications according to EtherNET.

I/O interface 314 is connected to operation unit 324 and captures a signal indicating a user operation from operation unit 324. Operation unit 324 typically includes a keyboard, a mouse, a touch panel, a touch pad or the like and accepts an operation from the user. Display interface 316 is connected to display unit 322 and sends an image signal for displaying an image to display unit 322 in accordance with a command from processor 302 or the like. Display unit 322 is an LCD, an organic EL display or the like, and presents various types of information to the user. In the example of FIG. 13, external apparatus 300 and display unit 322 are illustrated as separate units, but external apparatus 300 and display unit 322 may be configured integrally.

E. Control Procedure e1. Procedure in Control System 1

Figure 14:
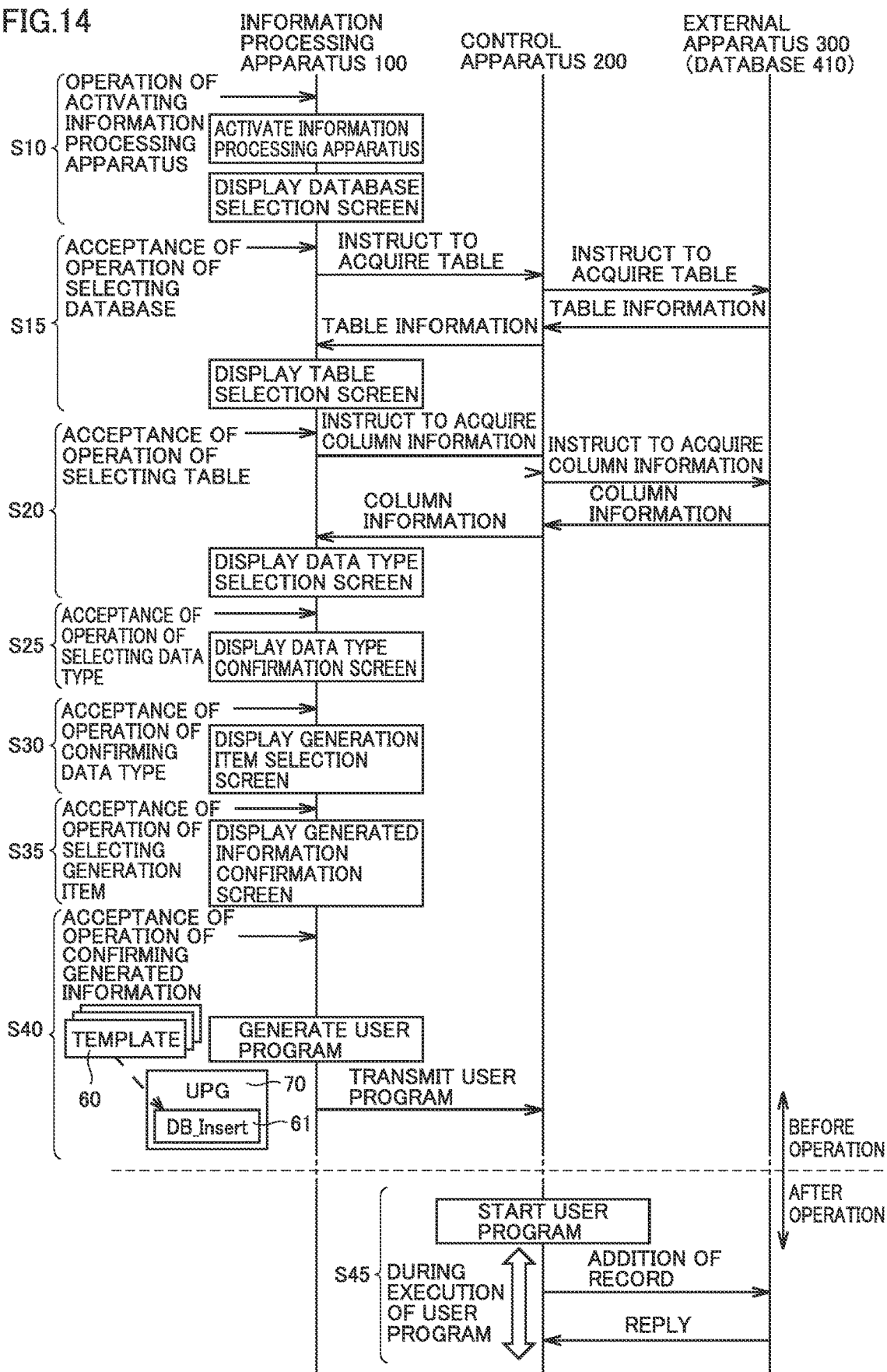
FIG. 14 is a flowchart illustrating a procedure of a control system.

FIG. 14 is a flowchart illustrating a procedure of control system 1. A data flow among information processing apparatus 100, control apparatus 200, and external apparatus 300 will be described with reference to FIG. 14. At step S10, information processing apparatus 100 accepts an activation instruction. Based on the acceptance, as development support program 30 is executed after the activation, information processing apparatus 100 displays database selection screen 510 in display unit 122.

At step S15, information processing apparatus 100 accepts an operation of selecting database 410 on database selection screen 510. Based on the acceptance, information processing apparatus 100 transmits an instruction to acquire table 420 stored in the selected database 410 to external apparatus 300 via control apparatus 200. External apparatus 300 outputs information of table 420 to information processing apparatus 100 via control apparatus 200. Information processing apparatus 100 displays table selection screen 511 in display unit 122 based on the information of table 420 transmitted from external apparatus 300.

At step S20, information processing apparatus 100 accepts an operation of selecting table 420 on table selection screen 511. Based on the acceptance, information processing apparatus 100 outputs an instruction to acquire information of column 450 included in the selected table 420 to external apparatus 300 via control apparatus 200. External apparatus 300 outputs the information of column 450 to information processing apparatus 100 via control apparatus 200. Information processing apparatus 100 displays data type selection screen 512 in display unit 122 based on the information of column 450 transmitted from external apparatus 300.

At step S25, information processing apparatus 100 accepts an operation of selecting the UPG data type on data type selection screen 512. Based on the acceptance, information processing apparatus 100 displays data type confirmation screen 513 in display unit 122.

At step S30, information processing apparatus 100 accepts an operation of confirming the UPG data type on data type confirmation screen 513. Based on the acceptance, information processing apparatus 100 displays generation item selection screen 514 in display unit 122.

At step S35, information processing apparatus 100 accepts the operation of selecting a generation item on generation item selection screen 514. Based on the acceptance, information processing apparatus 100 displays generated information confirmation screen 515 in display unit 122.

At step S40, information processing apparatus 100 accepts an operation of completing confirmation of generated information on generated information confirmation screen 515. Based on the acceptance, information processing apparatus 100 generates user program 70 including first program template 61 based on template 60 and transmits the generated user program 70 to the information processing apparatus.

Step S10, step S15, step S20, step S25, step S30, step S35, and step S40 described above are processing before operating control apparatus 200. Processing after operating control apparatus 200 will now be described.

At step S45, control apparatus 200 starts processing of user program 70. Control apparatus 200 executes first program template 61 included in user program 70 and adds a record to table 420 in database 410 of external apparatus 300. This record is configured by each member 150 of the structure of control apparatus 200. External apparatus 300 transmits, for example, a response indicating successful processing of adding a record to control apparatus 200.

e2. Procedure in Information Processing Apparatus 100

Figure 15:
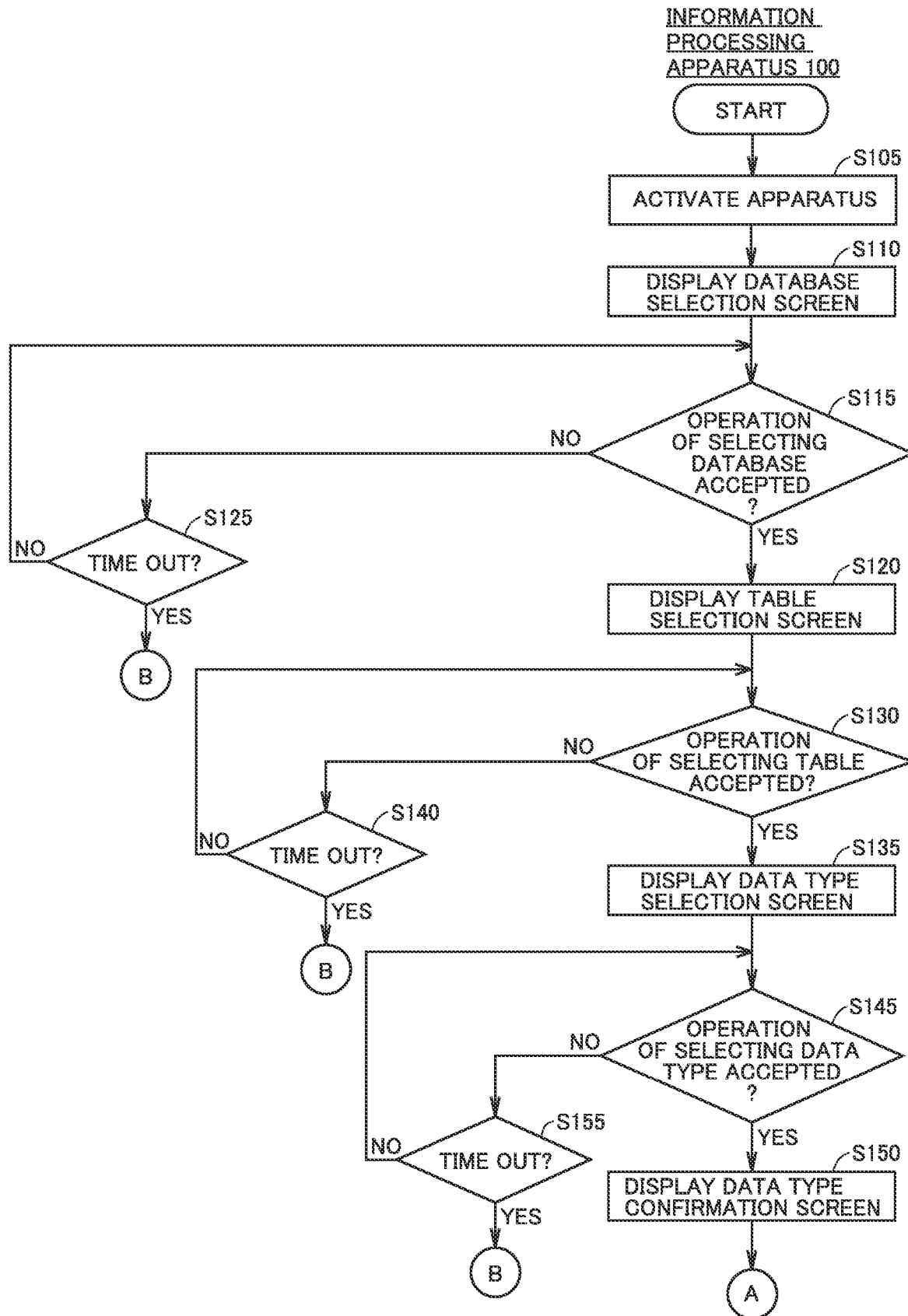
FIG. 15 is a flowchart illustrating a procedure when the information processing apparatus performs processing before operation.
Figure 16:
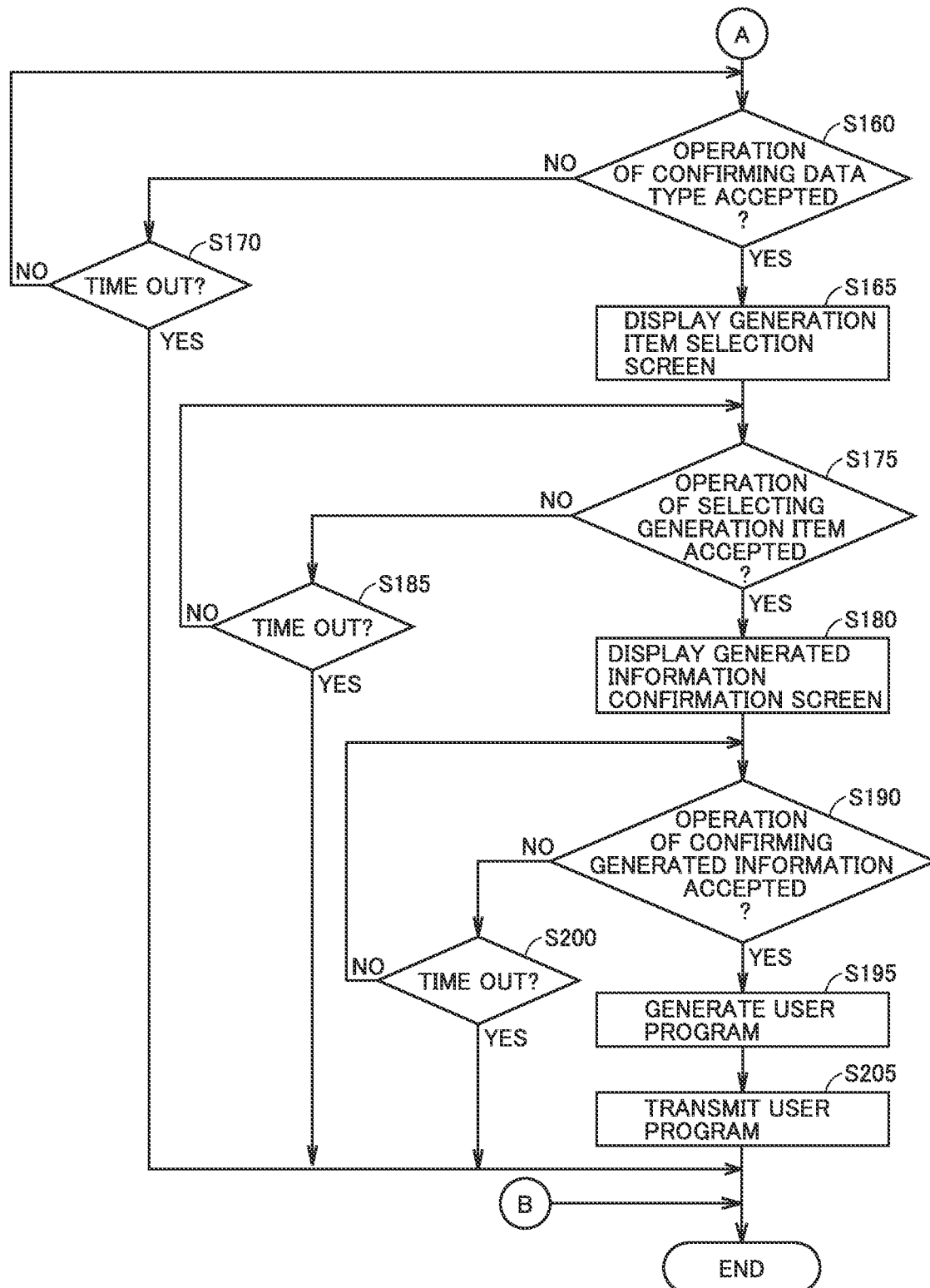
FIG. 16 is a flowchart illustrating a procedure when the information processing apparatus performs processing before operation.

The processing before operation of control apparatus 200 in the procedure described above with reference to FIG. 14 is, for example, processing performed by information processing apparatus 100. FIGS. 15 and 16 are flowcharts illustrating a procedure when information processing apparatus 100 performs processing before operation. Referring to FIG. 15, at step S105, information processing apparatus 100 accepts an activation instruction through a user operation using operation unit 124, and is then activated.

At step S110, when development support program 30 is executed after the activation, information processing apparatus 100 displays database selection screen 510 in display unit 122.

At step S115, information processing apparatus 100 decides whether it has accepted the operation of selecting database 410 on database selection screen 510. Information processing apparatus 100 switches control to step S120 when deciding that it has accepted the operation of selecting database 410 (YES at step S115). Otherwise (NO at step S115), information processing apparatus 100 switches control to step S125.

At step S120, information processing apparatus 100 displays table selection screen 511 in display unit 122 based on the information of table 420 transmitted from external apparatus 300.

At step S125, information processing apparatus 100 measures with a timer (not shown) an elapsed time from the time of the decision on whether it has accepted the operation of selecting database 410. When time-out is reached after a lapse of a predetermined period (e.g., one minute) (YES at step S125), information processing apparatus 100 ends the processing of this flowchart. Otherwise (NO at step S125), information processing apparatus 100 repeatedly performs control of step S115.

At step S130, information processing apparatus 100 decides whether it has accepted an operation of selecting table 420 on database selection screen 510. Information processing apparatus 100 switches control to step S135 when deciding that it has accepted the operation of selecting table 420 (YES at step S130). Otherwise (NO at step S130), information processing apparatus 100 switches control to step S140.

At step S135, information processing apparatus 100 displays data type selection screen 512 in display unit 122 based on the information of column 450 transmitted from external apparatus 300.

At step S140, information processing apparatus 100 measures with a timer (not shown) an elapsed time from the time of the decision on whether it has accepted the operation of selecting table 420. When time-out is reached after a lapse of a predetermined period (e.g., one minute) (YES at step S140), information processing apparatus 100 ends the processing of this flowchart. Otherwise (NO at step S140), information processing apparatus 100 repeatedly performs control of step S130.

At step S145, information processing apparatus 100 decides whether it has accepted the operation of selecting the UPG data type on data type selection screen 512. Information processing apparatus 100 switches control to step S150 when deciding that it has accepted the operation of selecting the data type (YES at step S145). Otherwise (NO at step S145), information processing apparatus 100 switches control to step S155.

At step S150, information processing apparatus 100 displays data type confirmation screen 513 in display unit 122.

At step S155, information processing apparatus 100 measures with a timer (not shown) an elapsed time from the time of the decision on whether it has accepted the operation of selecting the data type. When time-out is reached after a lapse of a predetermined period (e.g., one minute) (YES at step S155), information processing apparatus 100 ends the processing of this flowchart. Otherwise (NO at step S155), information processing apparatus 100 repeatedly performs control of step S145.

Referring to FIG. 16, at step S160, information processing apparatus 100 then decides whether or not it has accepted the operation of confirming the UPG data type on data type confirmation screen 513. Information processing apparatus 100 switches control to step S165 when deciding that it has accepted the operation of confirming the UPG data type (YES at step S160). Otherwise (NO at step S160), information processing apparatus 100 switches control to step S170.

At step S165, information processing apparatus 100 displays generation item selection screen 514 in display unit 122.

At step S170, information processing apparatus 100 measures with a timer (not shown) an elapsed time from the time of the decision on whether it has accepted the operation of confirming the UPG data type. When time-out is reached after a lapse of a predetermined period (e.g., one minute) (YES at step S170), information processing apparatus 100 ends the processing of this flowchart. Otherwise (NO at step S170), information processing apparatus 100 repeatedly performs control of step S160.

At step S175, information processing apparatus 100 decides whether it has accepted the operation of selecting a generation item on generation item selection screen 514. Information processing apparatus 100 switches control to step S180 when deciding that it has accepted the operation of selecting a generation item (YES at step S175). Otherwise (NO at step S175), information processing apparatus 100 switches control to step S185.

At step S180, information processing apparatus 100 displays generated information confirmation screen 515 in display unit 122.

At step S185, information processing apparatus 100 measures with a timer (not shown) an elapsed time from the time of the decision on whether it has accepted the operation of selecting a generation item. When time-out is reached after a lapse of a predetermined period (e.g., one minute) (YES at step S185), information processing apparatus 100 ends the processing of this flowchart. Otherwise (NO at step S185), information processing apparatus 100 repeatedly performs control of step S175.

At step S190, information processing apparatus 100 decides whether it has accepted the operation of completing the confirmation of generated information on generated information confirmation screen 515. Information processing apparatus 100 switches control to step S195 when deciding that it has accepted the operation of completing the confirmation of generated information (YES at step S190). Otherwise (NO at step S190), information processing apparatus 100 switches control to step S200.

At step S195, information processing apparatus 100 generates, for example, user program 70 including first program template 61.

At step S200, information processing apparatus 100 measures with a timer (not shown) an elapsed time from the time of the decision on whether it has accepted the operation of completing the confirmation of generated information. When time-out is reached after a lapse of a predetermined period (e.g., one minute) (YES at step S200), information processing apparatus 100 ends the processing of this flowchart. Otherwise (NO at step S200), information processing apparatus 100 repeatedly performs control of step S190.

At step S205, information processing apparatus 100 transmits the generated user program 70 to control apparatus 200.

Embodiment 2

Embodiment 2 according to the present disclosure will now be described. A configuration included in a control system 1a according to Embodiment 2 is different from the configuration included in control system 1 according to Embodiment 1 described above in part of the hardware configuration, and the other configuration is implemented using a similar hardware configuration. Processing implemented by the configuration included in control system 1a according to Embodiment 2 is similar to the processing implemented by the configuration included in information processing apparatus 100 according to Embodiment 1 except for that part of the processing is different. The following will describe a different hardware configuration and contents of different processing of a configuration included in control system 1 without repeating the description on the same hardware configuration and the same processing, with reference to FIG. 17.

Figure 17:
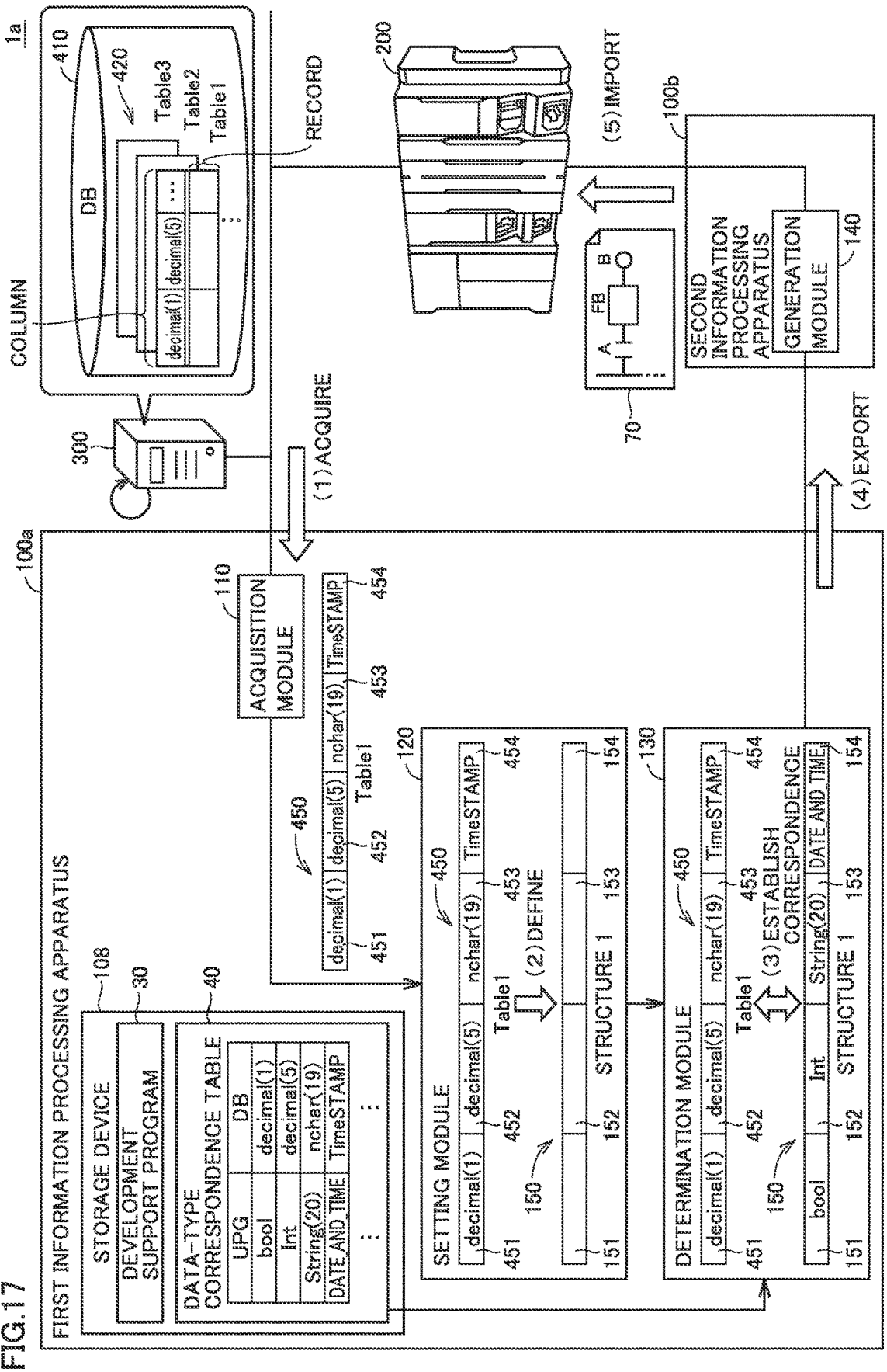
FIG. 17 illustrates an example configuration of a control system in Embodiment 2.

FIG. 17 illustrates an example configuration of control system 1a in Embodiment 2. In Embodiment 1 described above, one information processing apparatus 100 included in control system 1 acquires information (the number and data types of columns) of table 420. It has also been described that information processing apparatus 100 outputs the generated user program 70 to control apparatus 200 after determining the number and the data types of members 150 of the structure. In other words, one information processing apparatus 100 has the functions of acquisition module 110, setting module 120, determination module 130, and generation module 140. It has also been described that one information processing apparatus 100 performs processing using the functions. Contrastingly, in Embodiment 2 shown in FIG. 17, multiple information processing apparatuses 100 included in control system 1a perform processing using the functions described above.

Control system 1a includes a first information processing apparatus 100a and a second information processing apparatus 100b. First information processing apparatus 100a has the functions of acquisition module 110, setting module 120, and determination module 130. Second information processing apparatus 100b has generation module 140. Acquisition module 110 of first information processing apparatus 100a acquires information of table 420. Setting module 120 and determination module 130 of first information processing apparatus 100a determine the number and data types of members 150 of the structure, and then, export information including the number and data types of members 150. First information processing apparatus 100a outputs, for example, the above information as a file in a predetermined form of data. The predetermined form of data is, for example, a form of comma separated values (CSV).

Generation module 140 of second information processing apparatus 100b generates user program 70. The generated user program 70 is imported into control apparatus 200.

As described above, control system 1a is composed of information processing apparatus 100 having functions of some modules of all the modules and another information processing apparatus 100 having the function of another module. This allows control system 1a to, for example, easily add a module function using multiple information processing apparatuses 100.

Embodiment 3

Embodiment 3 according to the present disclosure will now be described. A configuration included in a control system 1b according to Embodiment 3 is different from the configuration included in control system 1 according to Embodiment 1 described above in part of the hardware configuration, and the other configuration is implemented using a similar hardware configuration. Processing implemented by the configuration included in control system 1b according to Embodiment 3 is similar to the processing implemented by the configuration included in information processing apparatus 100 according to Embodiment 1 except for that part of the processing is different. The following will describe a different hardware configuration and contents of different processing of a configuration included in control system 1 without repeating the description on the same hardware configuration and the same processing, with reference to FIG. 18.

Figure 18:
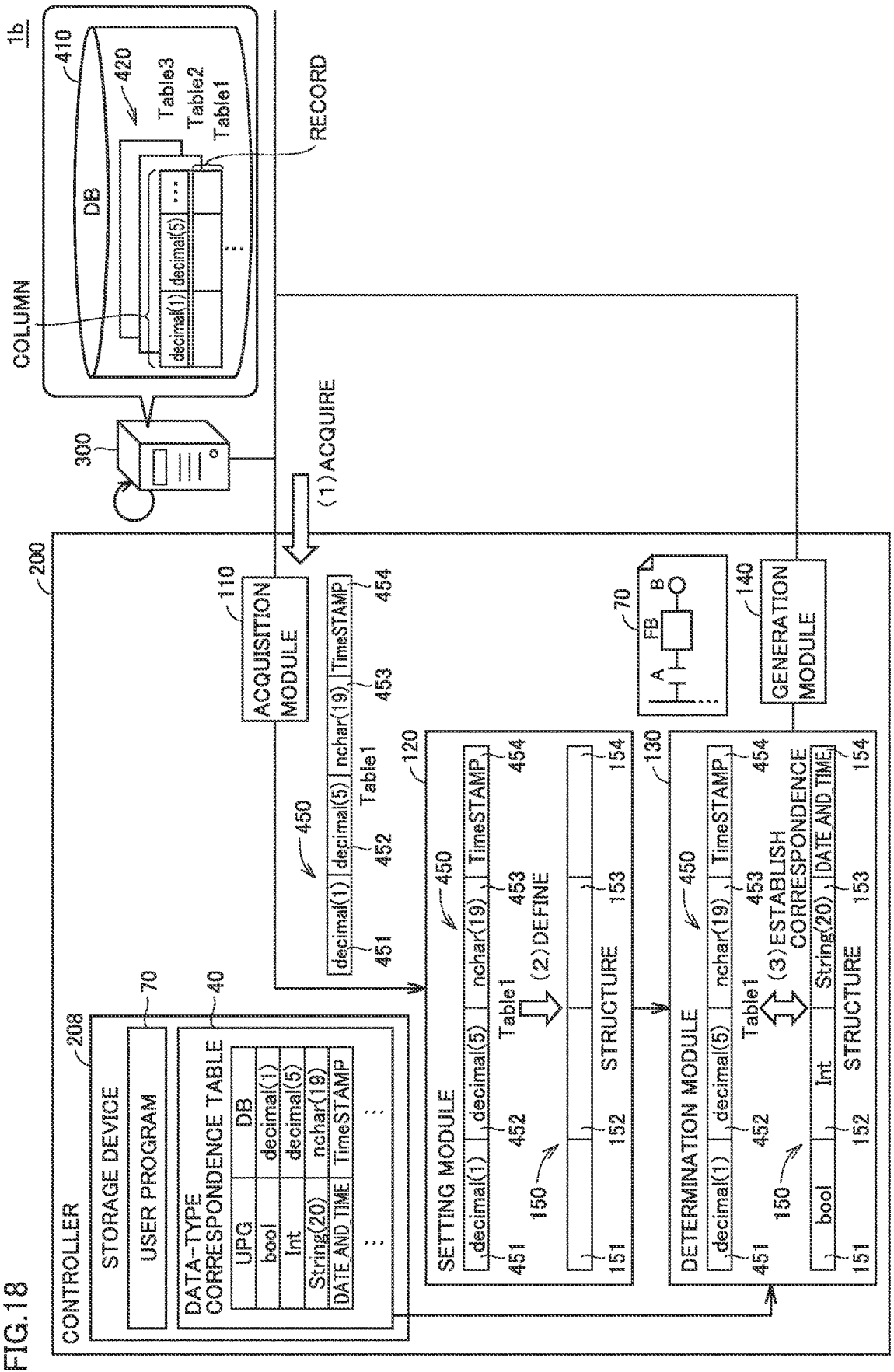
FIG. 18 illustrates an example configuration of a control system in Embodiment 3.

FIG. 18 illustrates an example configuration of control system 1b in Embodiment 3. In Embodiment 1 described above, information processing apparatus 100 included in control system 1 acquires information (the number and data types of columns) of table 420. It has also been described that information processing apparatus 100 outputs the generated user program 70 to control apparatus 200 after determining the number and the data types of members 150 of the structure. In other words, information processing apparatus 100 has the functions of acquisition module 110, setting module 120, determination module 130, and generation module 140. It has also been described that information processing apparatus 100 performs processing using the functions. Contrastingly, in Embodiment 3, control apparatus 200 included in control system 1b has the functions of acquisition module 110, setting module 120, determination module 130, and generation module 140. Control apparatus 200 performs processing using the module functions.

Acquisition module 110 of control apparatus 200 acquires information (the number and data types of columns) of table 420. Subsequently, setting module 120 defines member 150 of the structure, and then, determination module 130 determines the data type of the structure. Generation module 140 executes the generated user program 70 or the like in control apparatus 200.

Embodiment 1 has described that information processing apparatus 100 executes the functions of the respective modules through a user operation using operation unit 124 as development support program 30 is executed. Contrastingly, development support program 30 is not stored in storage device 208 of control apparatus 200. Control apparatus 200 automatically executes the functions of the respective modules without accepting the user operation. User program 70 for automatically executing the functions of the respective modules by control apparatus 200 as described above will now be described with reference to FIGS. 19 and 20.

Figure 19:
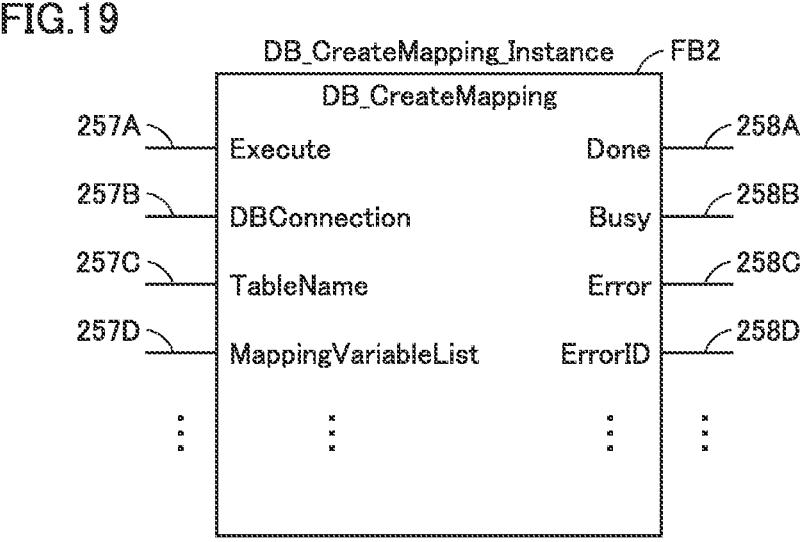
FIG. 19 shows an example function block included in a user program.

FIG. 19 shows an example of a function block FB2 included in user program 70. Function block FB2 will also be referred to as block FB2 below.

The program having the function of block FB2 may be defined by a block other than the function block. For example, block FB2 may also include a block defined in a ladder diagram, and a block defined by any of an instruction list, a structured text, and a sequential function chart, or a combination thereof. Block FB2 may also include a block described in a general programming language such as JavaScript or C language.

Block FB2 is a program for implementing an instruction to control access to database 410. More specifically, block FB2 is a program with a function of acquiring table information from table 420 and defining member 150 of the structure, and then determining the data type of the structure.

Block FB2 includes an input unit 257A to an input unit 257D for accepting a setting for the addition of a record and an output unit 258A to an output unit 258D for outputting information about the addition of a record.

Input unit 257A indicated as "Execute" accepts a setting for designating whether or not to perform processing of adding a record.

Input unit 257B indicated as "DBConnection" accepts a connection result acquired by executing a function block for connection to database 410. The connection result includes information (e.g., database name) for accessing database 410.

Input unit 257C indicated as "TableName" accepts a setting of a table name. Input unit 257C is defined to accept, for example, a variable of "DWORD" type.

Input unit 257D indicated as "MappingVariableList" accepts an input of a variable of a structure. Input unit 257D is defined to accept a predefined structure.

A table name (e.g., "Table1") of table 420 and a variable (e.g., InsertVal1) for referring to the entire structure are set as arguments in input unit 257C and input unit 257D of block FB2, respectively. Thus, control system 1b can cause control apparatus 200 to automatically perform processing including defining a structure and determining a data type of the structure.

When the processing of adding a record completes normally, a signal indicating a normal end is output from output unit 258A indicated as "Done". During the processing of adding a record, a signal indicating the generation processing being performed is output from output unit 258B indicated as "Busy". When the processing of adding a record is not generated normally, a signal indicating an abnormal end is output from output unit 258C indicated as "Error". In this case, an error ID for identifying the nature of an error is output from output unit 258D indicated as "ErrorID".

Figure 20:
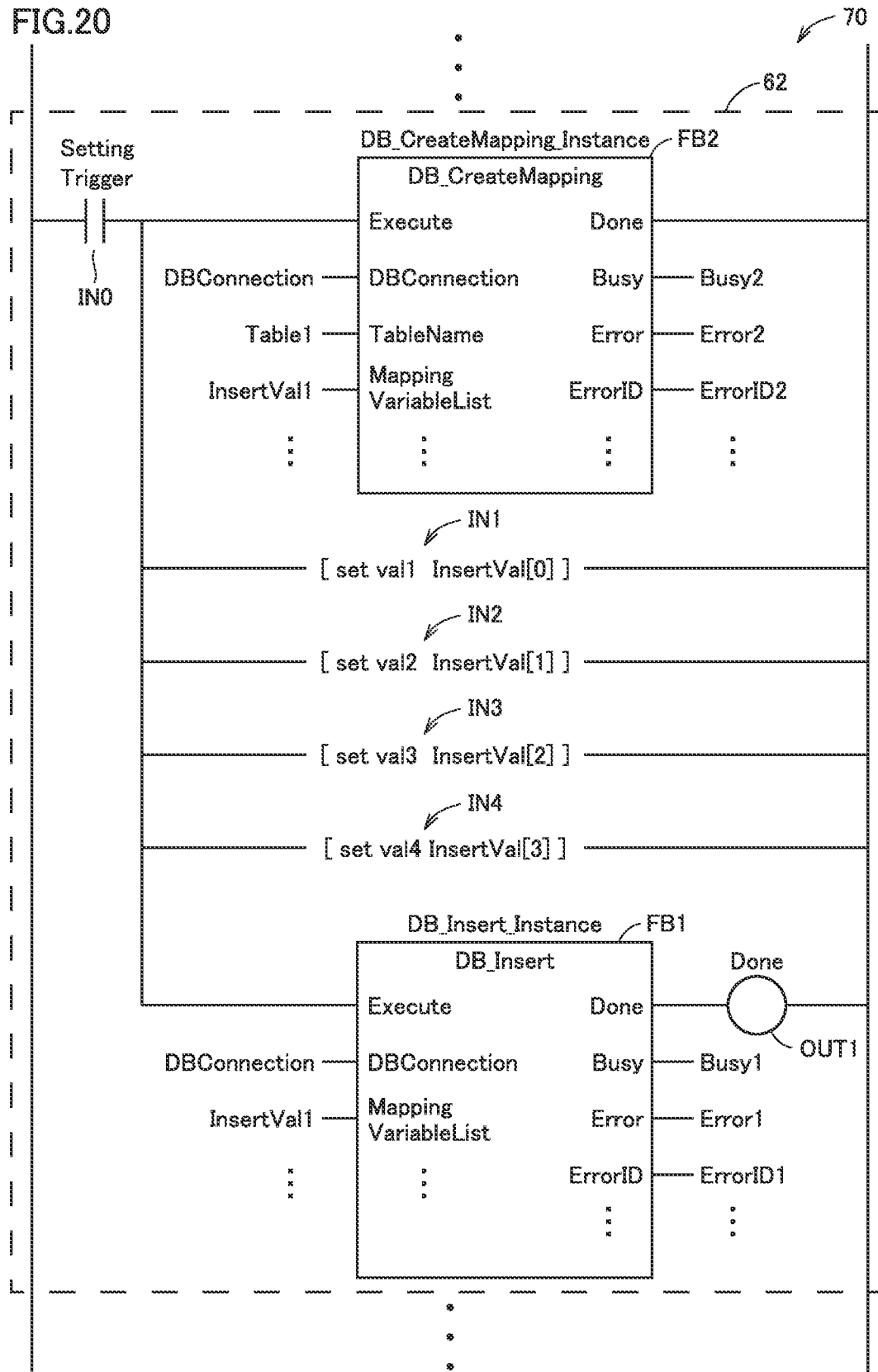
FIG. 20 illustrates an example user program including a function block.

FIG. 20 illustrates an example of user program 70 including function block FB2. Control apparatus 200 generates part of user program 70 shown in FIG. 10 using template 60 stored in storage device 108. Template 60 includes, for example, input elements IN0 to IN4, block FB1, block FB2, and output element OUT1. For example, the variables of input elements IN0 to IN4 and the variable of output element OUT1 included in template 60 are blank, and variables are allocated after the selection of template 60. Block FB1 corresponds to the function block described with reference to FIG. 9.

The functions of input elements IN0 to IN4, block FB1, and output element OUT1 are similar to the functions described above with reference to FIG. 10. Input elements IN to IN4 included in second program template 62 have variables allocated thereto, and values of the variables change in accordance with the allocated variables. In block FB2, each of a table name of table 420 and a variable for referring to the entire structure is set as an argument, as described above. Control apparatus 200 automatically performs processing including defining a structure and determining a data type of the structure using block FB2.

Variations

Embodiment 1 to Embodiment 3 have described the particulars displayed on the respective screens with reference to FIGS. 3 to 8. The particulars displayed on the respective screens are examples, and alternatively, any other particular may be displayed to accept selection for the particular.

Embodiment 1 to Embodiment 3 have described the input units and output units provided in the function block. The described input units and output units are examples, and alternatively, an input unit and an output unit other than the described units may be provided in the function block.

In Embodiment 2, first information processing apparatus 100a has the functions of acquisition module 110, setting module 120, and determination module 130. It has also been described that second information processing apparatus 100b has generation module 140. The functions of the respective modules included in information processing apparatus 100 are examples, and alternatively, each information processing apparatus 100 may have the function of any module. Information processing apparatus 100 may have the function of a module different from the above.

Notes

As descried above, the present embodiments include the following disclosure.

Configuration 1

A control system (1) for controlling a control target, the control system comprising:
a database (410) configured to hold one or more tables (420);
a control apparatus (200) configured to execute a control program (70) and access the database (410);

acquisition means (110) configured to acquire a number of columns (450) of a table (420) and a data type of each column (450), the table being selected from among the one or more tables (420);

setting means (120) configured to define a structure including a number of members (150) corresponding to the acquired number of columns (450), the structure being available in the control program (70); and determination means (130) configured to determine the data type of each member (150) of the structure in correspondence with the acquired data type of each column (450).

Configuration 2

The control system according to configuration 1, wherein the determination means (130) is configured to determine the data type of each member (150) of the structure from among data types available in the control program (70).

Configuration 3

The control system according to configuration 1 or 2, wherein the determination means (130) is configured to determine the data type of each member (150) of the structure in accordance with selection by a user from among one or more candidates of a data type.

Configuration 4

The control system according to any one of configurations 1 to 3, wherein the determination means (130) is configured to bring a table name of the selected table into correspondence (420) as attribute information of a variable, the variable being used for referring to entirety of the structure.

Configuration 5

The control system according to any one of configurations 1 to 4, wherein the determination means (130) is configured to bring a member name of each member (150) of the structure into correspondence with a column name of each column (450).

Configuration 6

The control system according to any one of configurations 1 to 5, wherein
the control program (70) includes a function block for executing an instruction to control access to the database (410), and
in the function block, each of a table name of the table (420) and a variable for referring to entirety of the structure is set as an argument.

Configuration 7

The control system according to any one of configurations 1 to 6, further comprising a generation unit (140) configured to generate a program template (61, 62) for performing processing of adding, to a corresponding table (420), a record including values set for the respective members (150).

Configuration 8

The control system according to any one of configurations 1 to 7, further comprising an information processing apparatus (100) configured to support development of the control program (70) executed in the control apparatus (200), wherein the information processing apparatus (100) comprises the acquisition means (110), the setting means (120), and the determination means (130).

Configuration 9

An information processing apparatus (100) configured to support development of a control program (70) executed in a control apparatus (200), the information processing apparatus (100) comprising:

acquisition means (110) configured to acquire a number of columns (450) of a table (70) and a data type of each column (450), the table (70) being selected from among one or more tables (70) held by a database (70), the database being accessible to the control apparatus (200);

setting means (120) configured to define a structure including a number of members (150) corresponding to the acquired number of columns (450), the structure being available in the control program (70); and determination means (130) configured to determine a data type of each member (150) of the structure in correspondence with the acquired data type of each column (450).

Configuration 10

An information processing program for an information processing apparatus (100) configured to support development of a control program (70) executed in a control apparatus (200), the information processing program causing the information processing apparatus (100) to perform the steps of:

acquiring a number of columns (450) of a table (420) and a data type of each column (450), the table being selected from among one or more tables (420) held by a database (70), the database being accessible to the control apparatus (200) (S20);

defining a structure including a number of members (150) corresponding to the acquired number of columns (450), the structure being available in the control program (70) (S25); and determining a data type of each member (150) of the structure in correspondence with the acquired data type of each column (450) (S30).

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1, 1*a*, 1*b* control system; 30 development support program; 40 data-type correspondence table; 60 template; 61 first program template; 62 second program template; 70 user program; 80 system program; 100 information processing apparatus; 100*a* first information processing apparatus; 100*b* second information processing apparatus; 102 control unit; 104, 206, 304 main memory; 108, 208, 308 storage device; 110 acquisition module; 112, 201, 312 communication interface; 114, 316 display interface; 116, 314 I/O interface; 120 setting module; 122, 322 display unit; 124, 324 operation unit; 130 determination module; 140 generation module; 150 member; 151 first member; 152 second member; 153 third member; 154 fourth member; 200 control apparatus;

202, 302 processor; 204 chip set; 222 internal bus controller; 224 fieldbus controller; 226 I/O unit; 239 memory card interface; 240 memory card; 255A, 255B, 255C, 257A, 257B, 257C, 257D input unit; 256A, 256B, 256C, 256D, 258A, 258B, 258C, 258D output unit; 280A, 280B servo driver; 300 external apparatus; 325 internal bus; 410 database; 420 table; 450 column; 451 first column; 452 second column; 453 third column; 454 fourth column; 461, 462 record; 510 database selection screen; 511 table selection screen; 512 data type selection screen; 513 data type confirmation screen; 514 generation item selection screen; 515 generated information confirmation screen; 540 next screen button; 542 previous screen button; 544 complete button; 558 selection field; 572 structure; 574 variable; FB1, FB2 function block (block).

The invention claimed is:

1. A control system for controlling a control target, the control system comprising:
a database configured to hold one or more tables; and
a control apparatus for production process automation, the control apparatus comprising control circuitry configured to access the database,
wherein the control apparatus is configured to perform at least:
acquiring a column name and a data type of each column of a table, the table being selected from among the one or more tables;
determining a data type of each member in correspondence with the acquired data type of each column, the data type being available in a user program,
displaying a screen including the column name and the data type of each column, and the data type of each member brought into correspondence with the data type of each column, and
generating at least part of the user program based on the determined data type of each member and one or more selected items,
wherein the determining comprises determining the data type of each member based on a list showing a correspondence between a data type of a column and a data type of a member,
wherein at least one of the one or more selected items is for addition of a record into the table in the database, and
wherein the generating comprises generating the at least part of the user program including an instruction corresponding to the at least one of the one or more selected items with a value set to each member being an input element in the user program.

2. The control system according to claim 1, wherein the determining comprises determining the data type of each member from among data types available in the user program.

3. The control system according to claim 1, wherein the determining comprises determining the data type of each member in accordance with a user operation.

4. The control system according to claim 1, wherein
the user program includes a first function block for executing an instruction to control access to the database, and
in the first function block, a variable corresponding to a target column is set as an argument.

5. The control system according to claim 1, wherein the user program includes a second function block for storing, in the control apparatus, data of a data type brought into correspondence with the data type of each column.

6. An control apparatus for production process automation, the control apparatus comprising control circuitry configured to access a database,
wherein the control apparatus performs operations comprising:
acquiring a column name and a data type of each column of a table, the table being selected from among one or more tables held by a database, the database being accessible to the control apparatus for production process automation;
determining a data type of each member in correspondence with the acquired data type of each column, the data type being available in the user program;
displaying a screen including the column name and the data type of each column, and the data type of each member brought into correspondence with the data type of each column; and
generating at least part of the user program based on the determined data type of each member and one or more selected items,
wherein the determining comprises determining the data type of each member based on a list showing a correspondence between a data type of a column and a data type of a member,
wherein at least one of the one or more selected items is for addition of a record into the table in the database, and
wherein the generating comprises generating the at least part of the user program including an instruction corresponding to the at least one of the one or more selected items with a value set to each member being an input element in the user program.

7. The control apparatus according to claim 6, wherein the determining comprises determining the data type of each member from among data types available in the user program.

8. The control apparatus according to claim 6, wherein the determining comprises determining the data type of each member in accordance with a user operation.

9. The control apparatus according to claim 6, wherein
the user program includes a first function block for executing an instruction to control access to the database, and
in the first function block, a variable corresponding to a target column is set as an argument.

10. The control apparatus according to claim 6, wherein the user program includes a second function block for storing, in the control apparatus, data of a data type brought into correspondence with the data type of each column.

11. A non-transitory storage medium storing an information processing program for a control apparatus for production process automation, the information processing program, when executed by one or more processors, causes the one or more processors to perform at least:
acquiring a column name and a data type of each column of a table, the table being selected from among one or more tables held by a database, the database being accessible to the control apparatus for production process automation;
determining a data type of each member available in the user program in correspondence with the acquired data type of each column;
displaying a screen including the column name and the data type of each column, and the data type of each member brought into correspondence with the data type of each column; and generating at least part of the user program based on the determined data type of each member and one or more selected items, wherein the determining comprises determining the data type of each member based on a list showing a correspondence between a data type of a column and a data type of a member, wherein at least one of the one or more selected items is for addition of a record into the table in the database, and wherein the generating comprises generating the at least part of the user program including an instruction corresponding to the at least one of the one or more selected items with a value set to each member being an input element in the user program.

12. The non-transitory storage medium according to claim 11, wherein the determining comprises determining the data type of each member from among data types available in the user program.

13. The non-transitory storage medium according to claim 11, wherein the determining comprises determining the data type of each member in accordance with a user operation.

14. The non-transitory storage medium according to claim 11, wherein the user program includes a first function block for executing an instruction to control access to the database, and in the first function block, a variable corresponding to a target column is set as an argument.

15. The non-transitory storage medium according to claim 11, wherein the user program includes a second function block for storing, in the control apparatus, data of a data type brought into correspondence with the data type of each column.

* * * * *